(12) United States Patent
Asghari et al.

(10) Patent No.: US 11,940,566 B2
(45) Date of Patent: Mar. 26, 2024

(54) SEQUENCING OF SIGNALS IN LIDAR SYSTEMS

(71) Applicant: SiLC Technologies, Inc., Monrovia, CA (US)

(72) Inventors: Mehdi Asghari, La Canada Flintridge, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 398 days.

(21) Appl. No.: 16/923,067

(22) Filed: Jul. 7, 2020

(65) Prior Publication Data
US 2022/0011416 A1 Jan. 13, 2022

(51) Int. Cl.
*G01C 3/08* (2006.01)
*G01S 7/4911* (2020.01)
*G01S 7/4913* (2020.01)
*G01S 17/34* (2020.01)

(52) U.S. Cl.
CPC ........... *G01S 7/4913* (2013.01); *G01S 7/4911* (2013.01); *G01S 17/34* (2020.01)

(58) Field of Classification Search
None
See application file for complete search history.

(56) References Cited

U.S. PATENT DOCUMENTS

| 8,541,744 | B1 | 9/2013 | Liu |
| 8,558,993 | B2 | 10/2013 | Newbury et al. |
| 9,310,487 | B2 | 4/2016 | Sakimura et al. |
| 9,857,468 | B1 | 1/2018 | Eichenholz et al. |
| 10,605,901 | B2 | 3/2020 | Lee et al. |
| 2015/0109603 | A1 | 4/2015 | Kim et al. |
| 2017/0146641 | A1 | 5/2017 | Walsh et al. |
| 2018/0120433 | A1 | 5/2018 | Eichenholz et al. |
| 2018/0136321 | A1 | 5/2018 | Verghese et al. |

(Continued)

FOREIGN PATENT DOCUMENTS

| CN | 107192355 B | 8/2019 |
| CN | 112241014 A | 1/2021 |

(Continued)

OTHER PUBLICATIONS

Rodriquez, Kari, International Search Report and Written Opinion, PCT/US2021/040579, International Searching Authority, U.S. Patent and Trademark Office, dated Oct. 13, 2021.

(Continued)

*Primary Examiner* — Mark Hellner
(74) *Attorney, Agent, or Firm* — Gavrilovich, Dodd & Lindsey LLP

(57) ABSTRACT

A LIDAR system includes one or more optical components that output multiple system output signals. The system also includes electronics that use light from the system output signals to generate LIDAR data. The LIDAR data indicates a distance and/or radial velocity between the LIDAR system and one or more object located outside of the LIDAR system. The electronics including a series processing component that processes electrical signals that are each generated from one of the system output signals. The series processing component processes the electrical signals generated from different system output signals in series.

37 Claims, 11 Drawing Sheets

(56) References Cited

U.S. PATENT DOCUMENTS

| | | | |
|---|---|---|---|
| 2019/0004151 A1 | 1/2019 | Abediasl et al. | |
| 2019/0018110 A1* | 1/2019 | Kremer | G02B 27/30 |
| 2019/0064329 A1 | 2/2019 | Liu et al. | |
| 2019/0257927 A1 | 8/2019 | Yao | |
| 2019/0369244 A1 | 12/2019 | Asghari et al. | |
| 2020/0103501 A1 | 4/2020 | Kotelnikov et al. | |
| 2020/0116837 A1 | 4/2020 | Aghari et al. | |
| 2020/0116842 A1 | 4/2020 | Aghari et al. | |
| 2020/0142065 A1 | 5/2020 | Boloorian et al. | |
| 2021/0033732 A1 | 2/2021 | Boloorian et al. | |
| 2021/0255324 A1* | 8/2021 | Dunn | G01S 7/4911 |

FOREIGN PATENT DOCUMENTS

| | | | | |
|---|---|---|---|---|
| JP | H1010227 A | * | 6/1996 | G01S 7/40 |
| JP | 2010151806 A | * | 7/2010 | Y02A 90/10 |
| JP | WO2018230474 A1 | * | 3/2020 | G01C 3/06 |
| WO | 2018/160240 A1 | | 9/2018 | |
| WO | WO 20200110779 A1 | * | 6/2020 | G01S 7/493 |

OTHER PUBLICATIONS

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Kang, Sung Chul, International Search Report and Written Opinion, Korean Intellectual Property Office, PCT/US2019/054153, dated Jan. 17, 2020.

Lee, Sun Hwa, International Preliminary Report on Patentability and Written Opinion, The International Bureau of WIPO, PCT/US19/57500, dated May 14, 2021.

Nakamura, Yukari, International Preliminary Report on Patentability and Written Opinion, The International Bureau of WIPO, PCT/US2019/054153, dated Apr. 22, 2021.

Pilot Photonics, Lyra OCS 1000, Optical comb laser module, Retrieved on Nov. 20, 2019 from Pilot Photonics: http://www.pilotphotonics.com/optical-frequency-comb-source/.

Van Acoleyen et al., "Two-Dimensional Dispersive Off-Chip Beam Scanner Fabricated on Silicon-On-Insulator", 2011, IEEE Photon. Technol. Lett., 23, 1270-1272.

Velodyne, HDL-64E S2 Datasheet, 2017. Retrieved from http://velodynelidar.com/lidar/products/brochure/HDL-64E%20S2%20datasheet_2010_lowres.pdf.

Young, Lee, International Search Report and Written Opinion, United States Patent and Trademark Office, PCT/US19/57500, dated Jan. 16, 2020.

Zhu et al., "Dual-Comb Ranging", Engineering, 4, Oct. 26, 2018, pp. 772-778.

Doherty, Fiona, International Preliminary Report on Patentability and Written Opinion, The International Bureau of WIPO, PCT/US2019/054153, dated Jan. 19, 2023.

* cited by examiner

SEQUENCING OF SIGNALS IN LIDAR SYSTEMS

FIELD

The invention relates to optical devices. In particular, the invention relates to LIDAR assemblies.

BACKGROUND

LIDAR systems can output multiple system output signals that each carries a different channel. The system output signals can each be reflected by one or more objects located outside of the LIDAR system. System return signals can carry the reflected light back to the LIDAR system. Each of the system return signals carries a different one of the channels.

The LIDAR system can include electronics that process light from the system return signals so as to generate LIDAR data that indicates the distance and/or radial velocity between the LIDAR system and the one or more objects. The electronics include components that are duplicated so that the light from different system return signals can be processed in parallel. The duplication of these components increases the cost and/or complexity of the LIDAR system. As a result, there is a need for an improved LIDAR system.

SUMMARY

A LIDAR system includes one or more optical components that output multiple system output signals. The system also includes electronics that use light from the system output signals to generate LIDAR data. The LIDAR data indicates a distance and/or radial velocity between the LIDAR system and one or more object located outside of the LIDAR system. The electronics including a series processing component that processes electrical signals that are each generated from one of the system output signals. The series processing component processes the electrical signals generated from different system output signals in series.

DESCRIPTION

A LIDAR system is configured to output multiple system output signals that each carries a different channel. The system output signals can be reflected by objects located outside of the LIDAR system. The LIDAR system includes electronics that use light from the system output signals to generate multiple LIDAR data results indicating the distance and/or radial velocity between the LIDAR system and the one or more objects. The LIDAR system is configured such that one or more electronic components included in the electronics process signal from different channels in series rather than in parallel. The ability to process these signals in series eliminates the need to duplicate the electronic components. As a result, the complexity and cost of the LIDAR system is reduced.

Figure 1A:
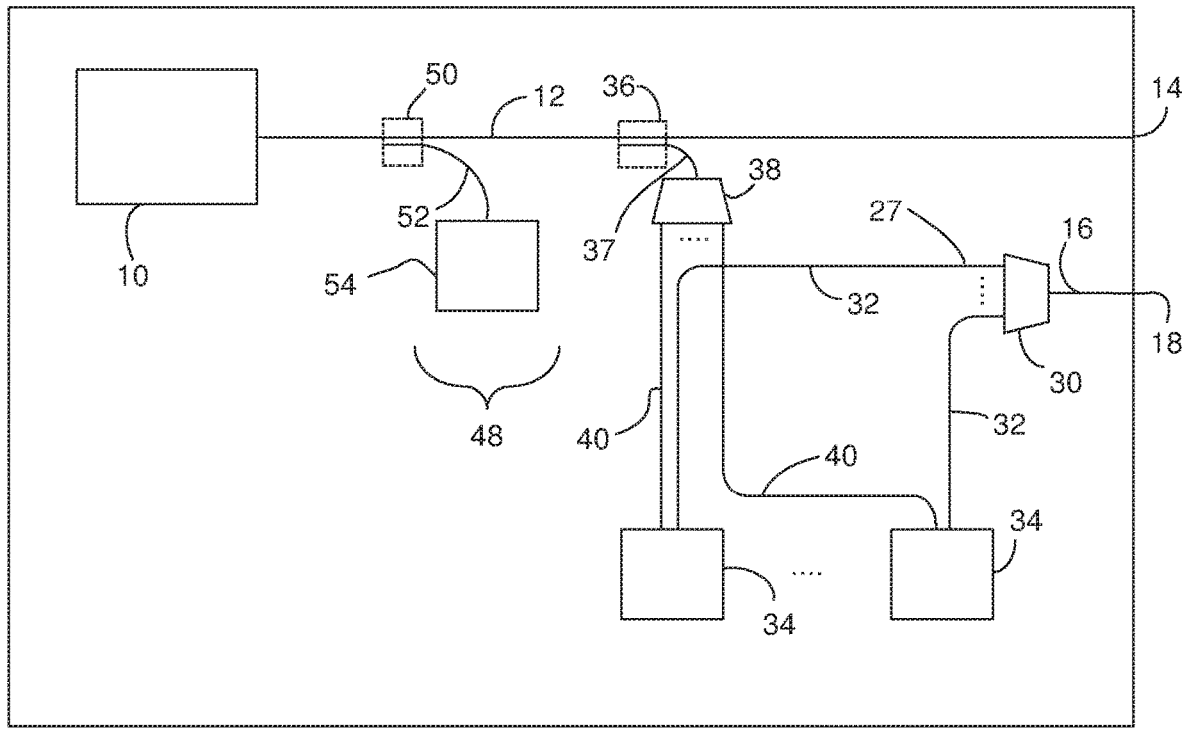
FIG. 1A is a top view of a LIDAR chip that is suitable for use with a LIDAR adapter.

FIG. 1A is a topview of a LIDAR chip that includes a light source 10 that outputs an outgoing LIDAR signal. The outgoing LIDAR signal includes one or more different channels that are each at a different wavelength. The wavelengths of the channels can be periodically spaced in that the wavelength increase from one channel to the next channel (the channel spacing) is constant or substantially constant. In some instances, the channels spacing is constant and greater than 0.5 nm, 1 nm, 3 nm, or 5 nm, and/or less than 10 nm, 15 nm, or 20 nm. In some instances, the number of channels, N, is greater than 2, 4 or 8 and/or less than 16, 32, or 64. A suitable light source 10 for generating multiple channels with periodically spaced wavelengths includes, but is not limited to, comb lasers and one or more single wavelength and/or one or more multiple wavelength lasers with outputs multiplexed into an outgoing LIDAR signal.

The LIDAR chip also includes a utility waveguide 12 that receives the outgoing LIDAR signal from the light source 10. The utility waveguide 12 terminates at a facet 14 and carries the outgoing LIDAR signal to the facet 14. The facet 14 can be positioned such that the outgoing LIDAR signal traveling through the facet 14 exits the chip and serves as a LIDAR output signal. For instance, the facet 14 can be positioned at an edge of the chip so the outgoing LIDAR signal traveling through the facet 14 exits the chip and serves as a LIDAR output signal.

The LIDAR output signal travels away from the chip and may be reflected by objects in the path of the LIDAR output signal. The reflected signal travels away from the objects. When the LIDAR output signal is reflected, at least a portion of the light from the reflected signal is returned to an input waveguide 16 on the LIDAR chip as a LIDAR input signal. The input waveguide 16 includes a facet 18 through which the LIDAR input signal can enter the input waveguide 16. The portion of the LIDAR input signal that enters the input waveguide 16 can be considered an incoming LIDAR signal. The input waveguide 16 carries the incoming LIDAR signal to comparative demultiplexer 30. When the incoming LIDAR signal includes multiple channels, the comparative demultiplexer 30 divides the incoming LIDAR signal into different comparative signals that each carries a different one of the channels. The comparative demultiplexer 30 outputs the comparative signals on different comparative waveguides 32. The comparative waveguides 32 each carry one of the comparative signals to a different processing component 34.

The LIDAR chip includes a splitter 36 that moves a portion of the outgoing LIDAR signal from the utility waveguide 12 onto a reference waveguide 37 as a reference signal. Suitable splitters 36 include, but are not limited to, optical couplers, y-junctions, and MMIs.

The reference waveguide 37 carries the reference light signal to a reference demultiplexer 38. When the reference light signal includes multiple channels, the reference demultiplexer 38 divides the reference light signal into different reference signals that each has a different wavelength. The reference demultiplexer 38 outputs the reference signals on different reference waveguides 40. The reference waveguides 40 each carry one of the reference signals to a different one of the processing components 34.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the reference signal of the same wavelength and/or carrying the same channel are received at the same processing component 34.

As will be described in more detail below, the processing components 34 each combines a comparative signal with the corresponding reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch 48 for controlling operation of the light source 10. The control branch 48 includes a directional coupler 50 that moves a portion of the outgoing LIDAR signal from the utility waveguide 12 onto a control waveguide 52. The coupled portion of the outgoing LIDAR signal serves as a tapped signal. Although FIG. 1A illustrates a directional coupler 50 moving portion of the outgoing LIDAR signal onto the control waveguide 52, other signal-tapping components can be used to move a portion of the outgoing LIDAR signal from the utility waveguide 12 onto the control waveguide 52. Examples of suitable signal tapping components include, but are not limited to, y-junctions, and MMIs.

The control waveguide 52 carries the tapped signal to control components 54. The control components can be in electrical communication with electronics 62. During operation, the electronics 62 can adjust the frequency of the outgoing LIDAR signal in response to output from the control components. An example of a suitable construction of control components is provided in U.S. patent application Ser. No. 16/875,987, filed on 16 May 2020, entitled "Monitoring Signal Chirp in LIDAR Output Signals," and in U.S. patent application Ser. No. 15/977,957, filed on 11 May 2018, entitled "Optical Sensor Chip;" each of which incorporated herein in its entirety.

Suitable electronics 62 can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the light source 10 is shown as being positioned on the LIDAR chip, all or a portion of the light source 10 can be located off the LIDAR chip. FIG. 1B illustrates an example of a light source 10 that includes multiple laser sources 68. The light source of FIG. 1B can be located off the LIDAR chip, positioned on the LIDAR chip, or integrated on the LIDAR chip. In some instances, each of the laser sources 68 outputs one or more of the channels on a source waveguide 70. The source waveguides 70 carry the channels to a laser multiplexer 72 that combines the channels so as to form a light signal that is received on a channel waveguide or the utility waveguide 12. Suitable laser multiplexers 72 include, but are not limited to, Arrayed Waveguide Grating (AWG) multiplexers, echelle grating multiplexers, and star couplers. The electronics can operate the laser sources 68 so the laser sources 68 concurrently output each of the channels. The electronics can operate the laser sources 68 so the laser sources 68 concurrently output each of the channels.

In some instances, each of the laser sources 68 outputs one of the channels on a source waveguide 70. The total number of laser sources 68 included in the light source 10 can be greater than or equal to the number of LIDAR output signals that are concurrently directed to a sample region. In some instances, total number of laser sources 68 included in the light source 10 is equal to the number of LIDAR output signals that are concurrently directed to a sample region. As a result, each laser sources 68 can be the source of a different one of the LIDAR output signals that are concurrently directed to a sample region.

The electronics can operate the laser sources 68 independently. For instance, the electronics can operate the laser sources 68 so as to provide particular LIDAR output signal(s) with a particular frequency versus time waveform. Since the electronics can operate the laser sources 68 independently and each laser sources 68 can be the source of a different one of the LIDAR output signals, the electronics can operate the laser sources 68 so different LIDAR output signals have different frequency versus time waveforms.

Figure 2:
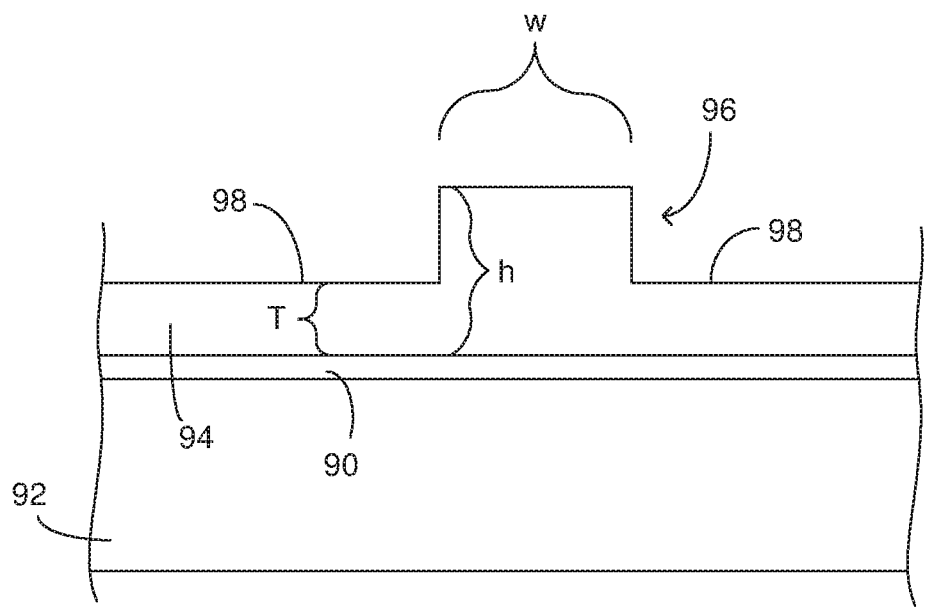
FIG. 2 is a cross-section of a LIDAR chip according to FIG. 1A constructed from a silicon-on-insulator wafer.

Suitable platforms for the LIDAR chips include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 90 between a substrate 92 and a light-transmitting medium 94. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1A can be positioned on or over the top and/or lateral sides of the substrate.

The portion of the chip illustrated in FIG. 2 includes a waveguide construction that is suitable for use with chips constructed from silicon-on-insulator wafers. A ridge 96 of the light-transmitting medium extends away from slab regions 98 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides on LIDAR chips constructed according to FIG. 1A.

The LIDAR chips can be used in conjunction with a LIDAR adapter. In some instances, the LIDAR adapter can be optically positioned between the LIDAR chip and the one or more reflecting objects and/or the field of view in that an optical path that the LIDAR input signal(s) and/or the LIDAR output signal travels from the LIDAR chip to the field of view passes through the LIDAR adapter. Additionally, the LIDAR adapter can be configured to operate on the LIDAR input signal and the LIDAR output signal such that the LIDAR input signal and the LIDAR output signal travel on different optical pathways between the LIDAR adapter and the LIDAR chip but on the same optical pathway between the LIDAR adapter and a reflecting object in the field of view.

Figure 3:
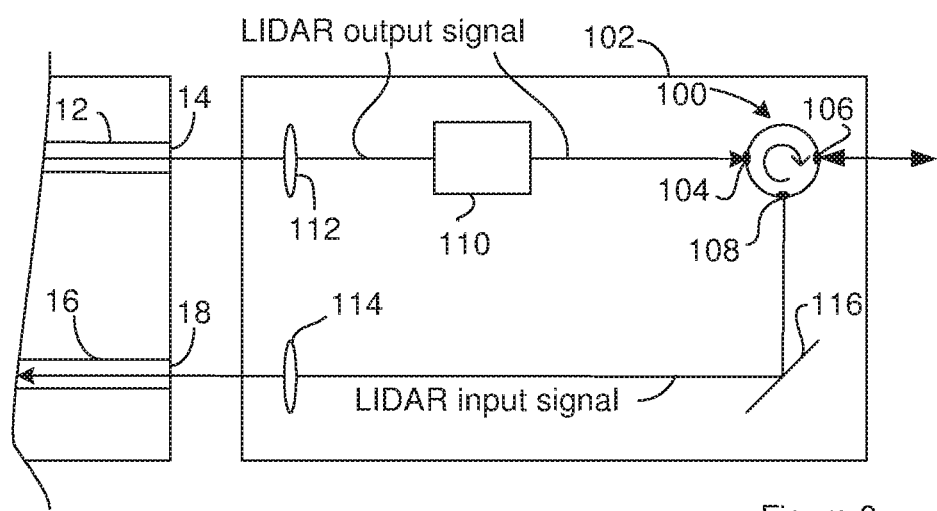
FIG. 3 is a top view of a LIDAR adapter in optical communication with an LIDAR chip.

FIG. 3 illustrates an example of a LIDAR adapter that is suitable for use with the LIDAR chip of FIG. 1A. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106. The LIDAR adapter can be configured such that the output of the LIDAR output signal from the second port 106 can also serve as the output of the LIDAR output signal from the LIDAR adapter. The portion of the LIDAR output signal output from the LIDAR adapter and/or the portion of the LIDAR output signal output from the second port 106 can serve as a preliminary system output signal. As a result, the preliminary system output signal can be output from the LIDAR adapter such that the preliminary system output signal is traveling toward a sample region in the field of view or toward one or more other optical components such as a directional component.

The preliminary system output signal includes, consists of, or consists essentially of light from the LIDAR output signal received from the LIDAR chip. Accordingly, the preliminary system output signal may be the same or substantially the same as the LIDAR output signal received from the LIDAR chip. However, there may be differences between the preliminary system output signal and the LIDAR output signal received from the LIDAR chip. For instance, the preliminary system output signal can experience optical loss as it travels through the LIDAR adapter.

When light from the preliminary system output signal is reflected by one or more objects located in a sample region(s), at least a portion of the reflected light returns to the adapter as a returned signal. For instance, at least a portion of the reflected light can return to circulator 100 and enter the circulator 100 through the second port 106. FIG. 3 illustrates the preliminary system output signal and the returned signal traveling between the LIDAR adapter and the sample region along the same optical path.

The returned signal exits the circulator 100 through the third port 108 and is directed to the input waveguide 16 on the LIDAR chip. Accordingly, light from the returned signal can serve as the LIDAR input signal and the LIDAR input signal includes or consists of light from the LIDAR return signal. Accordingly, the LIDAR output signal and the LIDAR input signal travel between the LIDAR adapter and the LIDAR chip along different optical paths.

As is evident from FIG. 3, the LIDAR adapter can include optical components in addition to the circulator 100. For instance, the LIDAR adapter can include components for directing and controlling the optical path of the LIDAR output signal and the LIDAR return signal. As an example, the adapter of FIG. 3 includes an optional amplifier 110 positioned so as to receive and amplify the LIDAR output signal before the LIDAR output signal enters the circulator 100. The amplifier 110 can be operated by the electronics 62 allowing the electronics 62 to control the power of the LIDAR output signal.

FIG. 3 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal on the facet 18 of the input waveguide 16.

The LIDAR adapter can also include one or more direction changing components such as mirrors. FIG. 3 illustrates the LIDAR adapter including a mirror as a direction-changing component 116 that redirects the LIDAR return signal from the circulator 100 to the facet 18 of the input waveguide 16.

The LIDAR chips include one or more waveguides that constrains the optical path of one or more light signals. While the LIDAR adapter can include waveguides, the optical path that the light from the returned signal and the LIDAR output signal travel between components on the LIDAR adapter and/or between the LIDAR chip and a component on the LIDAR adapter can be free space. For instance, light from the returned signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by light from the returned signal and the preliminary system output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

Figure 4:
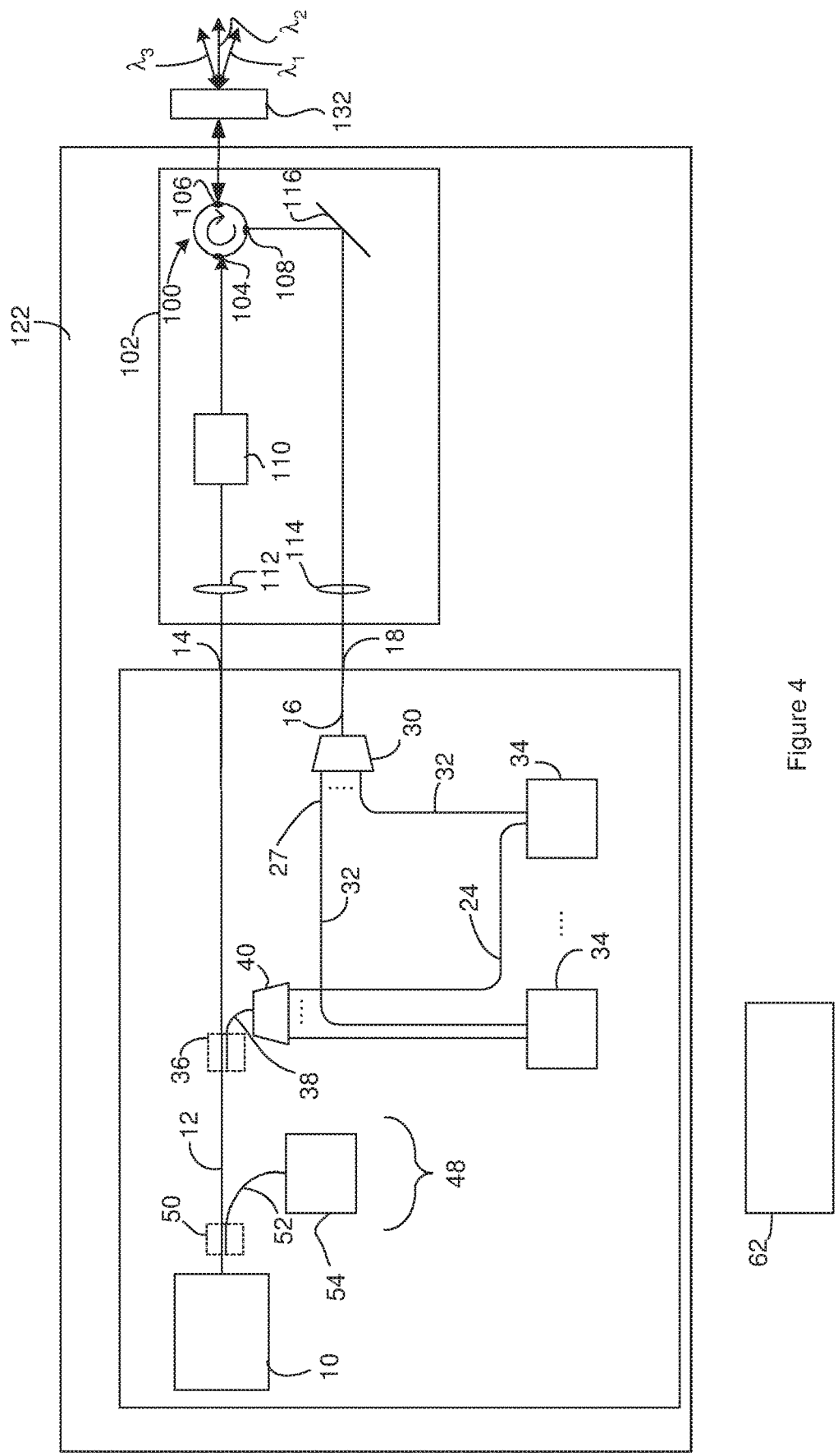
FIG. 4 is a topview of a LIDAR system that includes the LIDAR chip and electronics of FIG. 1A and the LIDAR adapter of FIG. 3 on a common support.

The LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR assembly that includes the LIDAR chip and electronics 62 of FIG. 1A and the LIDAR adapter of FIG. 3 on a common support 122. Although the electronics 62 are illustrated as being located on the common support, all or a portion of the electronics can be located off the common support. Suitable approaches for mounting the LIDAR chip, electronics, and/or the LIDAR adapter on the common support include, but are not limited to, epoxy, solder, and mechanical clamping.

Although the LIDAR assembly is shown as operating with a LIDAR chip that outputs a single LIDAR output signal, the LIDAR chip can be configured to output multiple LIDAR output signals. Multiple LIDAR adapters can be used with a single LIDAR chip and/or a LIDAR adapter can be scaled to receive multiple LIDAR output signals.

A LIDAR system can include the LIDAR assembly 130 employed in conjunction with one or more additional optical components. For instance, LIDAR a system can include the LIDAR assembly 130 employed in conjunction with a directional component 132 as shown in FIG. 4.

In FIG. 4, the directional component 132 receives the preliminary system output signal output from the adapter. The directional component 132 separates the channels carried by the preliminary system output signal into system output signals that each carries a different one of the channels. The directional component 132 can also be configured to steer each system output signal to multiple different sample regions in a field of view. Light from a system output signal can be reflected by one or more objects positioned in a sample region illuminated by the system output signal. The light returns to the LIDAR system in a system return signal. Different system return signals each carry a different one of the channels. The directional component can be configured to combine the system return signals into the returned signal that is output from the directional component and received by the LIDAR assembly and/or by the adapter.

Figure 5:
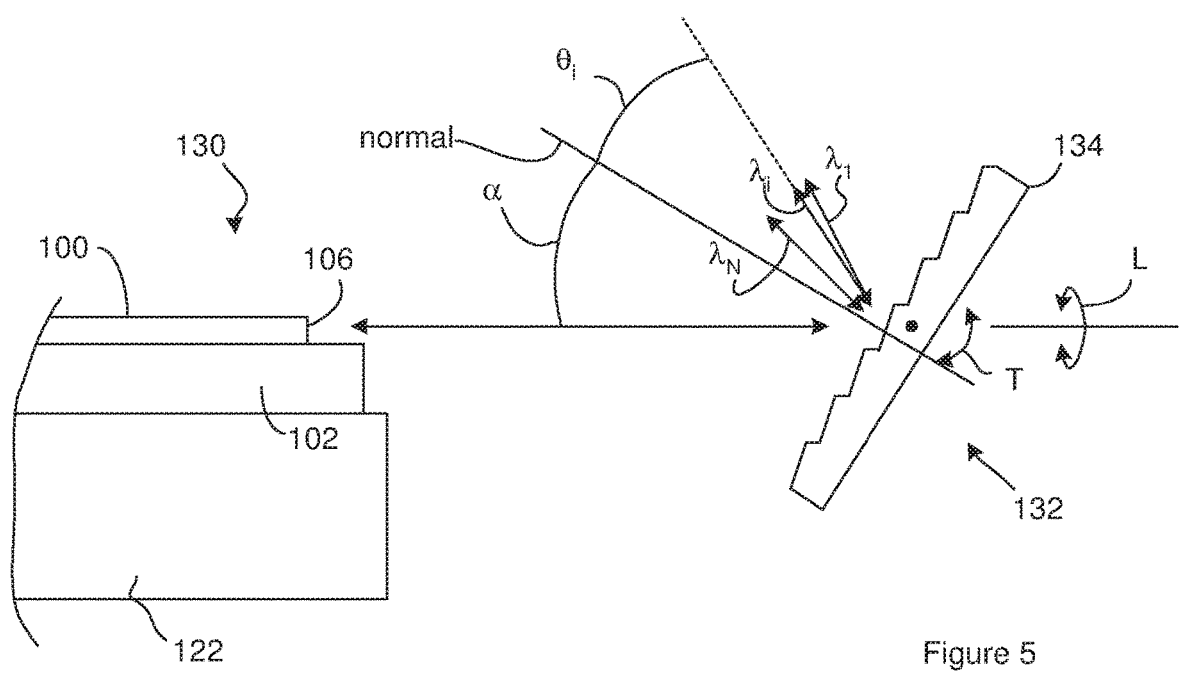
FIG. 5 is a cross section of a LIDAR system that includes a LIDAR assembly in optical communication with a directional component that includes a reflective optical grating.

FIG. 5 is an example of a cross section of a LIDAR system that includes a LIDAR assembly 130 in optical communication with a directional component 132. The cross section is taken through the LIDAR output signal and perpendicular to the common support 122. The LIDAR assembly 130 can be constructed as disclosed above. For instance, the LIDAR assembly 130 can be constructed according to FIG. 4.

The directional component 132 includes an optical grating 134 configured to receive the LIDAR output signal from the LIDAR assembly 130. The optical grating 134 is a reflective optical grating 134 that reflects the LIDAR output signal such that the LIDAR output signal is demultiplexed into system output signals. Each of the system output signals carries one of the channels that are labeled $\lambda_1$ through $\lambda_N$ where N represents the number of channels output from the optical grating 134. The system output signals each travels away from the optical grating 134 in a different direction. When all or a portion of the system output signals are reflected by an object in the path of the system output signal, a portion of the reflected light returns to the optical grating 134 as a LIDAR input channel. The optical grating 134 is configured to multiplex the LIDAR input channels into the LIDAR return signal that is received by the LIDAR assembly 130. Suitable reflective optical gratings 134 include, but are not limited to, ruled diffraction gratings, holographic diffraction gratings, and digital planar holographic diffraction gratings.

Figure 6:
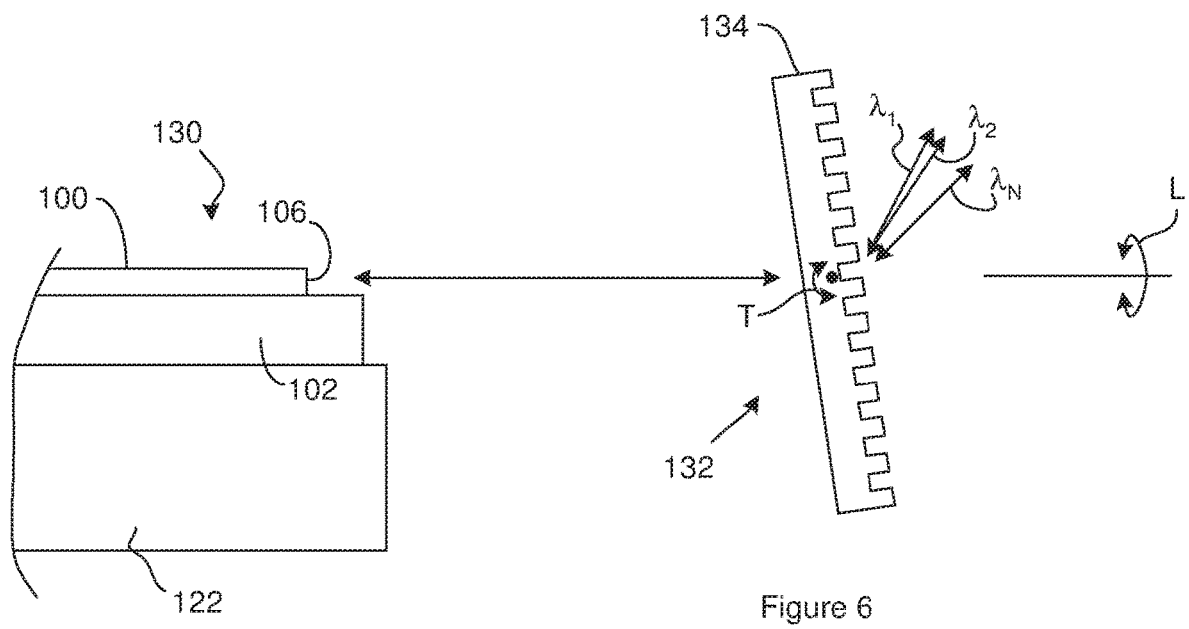
FIG. 6 is a cross section of a LIDAR system that includes a LIDAR assembly in optical communication with a directional component that includes a transmissive optical grating.

The optical grating 134 can be a transmissive optical grating 134. For instance, FIG. 6 is a cross section of a LIDAR system having a LIDAR assembly 130 and a directional component 132 that includes a transmissive optical grating 134. The cross section is taken through the LIDAR output signal and perpendicular to the common support 122. The LIDAR assembly 130 can be constructed as disclosed above. For instance, the LIDAR assembly 130 can be constructed according to FIG. 4.

The transmissive optical grating 134 receives the LIDAR output signal from the LIDAR assembly 130. The LIDAR output signal is transmitted through the optical grating 134 and output from the optical grating 134 such that the LIDAR output signal is demultiplexed into system output signals labeled $\lambda_1$ through $\lambda_N$. The system output signals each travels away from the optical grating 134 in a different direction (00. When all or a portion of the system output signals are reflected by an object in the path of the system output signal, a portion of the reflected light returns to the optical grating 134 as a LIDAR input channel. The optical grating 134 is configured to multiplex the LIDAR input channels into the LIDAR return signal that is received by the LIDAR assembly 130. Suitable transmissive optical gratings 134 include, but are not limited to, ruled diffraction gratings, holographic diffraction gratings, and digital planar holographic diffraction gratings.

The optical gratings 134 can be rotated in one or more directions in order to steer the direction that the system output signals travel away from the optical grating 134. The one or more rotations of the optical grating 134 can be performed by motors and/or actuation mechanism including, but not limited to, motors such as electromagnetic motors and piezoelectric motors.

In some instances, the optical grating 134 can be rotated such that the angle of incidence ($\alpha$) of the LIDAR input signal on the optical grating 134 does not change or does not change substantially. For instance, the optical grating 134 can be rotated around an axis that is parallel to the direction of the LIDAR output signal and includes the location where the direction of the LIDAR output signal is incident on the optical grating 134 (the incident axis) as illustrated by the arrow labeled L in FIG. 5 and FIG. 6. Since the angle of incidence ($\alpha$) does not substantially change during these rotations, the angular direction each system output signal travels away from the optical grating 134 ($\theta_i$) remains constant or substantially constant.

Additionally or alternately, the optical gating can be rotated so as to change the angle of incidence ($\alpha$) of the LIDAR input signal on the optical grating 134. For instance, the optical grating 134 can be rotated around a transverse axis that is perpendicular to the incident axis and parallel to a plane of the optical grating 134 and/or extends through the optical grating 134 as illustrated by the arrow labeled T in FIG. 5 and FIG. 6. In some instances, the transverse axis is selected such that the location where the direction of the LIDAR output signal is incident on the optical grating 134 does not change or does not change substantially during the rotation in order to reduce possible movement of a portion of the LIDAR output signal off the optical grating. Since the angle of incidence ($\alpha$) changes during this rotation, the angular direction that each system output signal travels away from the optical grating 134 ($\theta_i$) changes in response to the rotation.

The directional component 132 can optionally include one or more active and/or one or more passive optical components between the optical grating 134 and the LIDAR assembly 130. Examples of suitable passive optical components include, but are not limited to, optical fibers, lenses, mirrors, polarizers, polarization splitters, and wave plates. Active components include components where electrical energy is applied to and/or received from the component in order for the optical component to provide its intended function. Examples of suitable active optical components include, but are not limited to, amplifiers 140, actuated mirrors, and actuated lenses.

Other examples of suitable directional components 132 can be found in U.S. patent application Ser. No. 16/675,203, filed on Nov. 5, 2019, entitled "LIDAR Output Steering Systems Having Optical Gratings," and incorporated herein in its entirety.

Although FIG. 4 through FIG. 6 illustrate the directional component 132 positioned outside of the LIDAR assembly, the directional component can be included in the LIDAR assembly. For instance, the directional component 132 can be positioned on the base 102 or on the common support 122. When the directional component 132 is positioned on the base 102, the directional component 132 receives the LIDAR output signal from the circulator. For instance, the directional component 132 can receive the LIDAR output signal from the second port 106 of the circulator 100. Accordingly, the portion of the LIDAR output signal that exits from the circulator serves as the preliminary system output signal. The directional component 132 separates the channels carried by the preliminary system output signal into system output signals that each carries a different one of the channels.

Figure 7A:
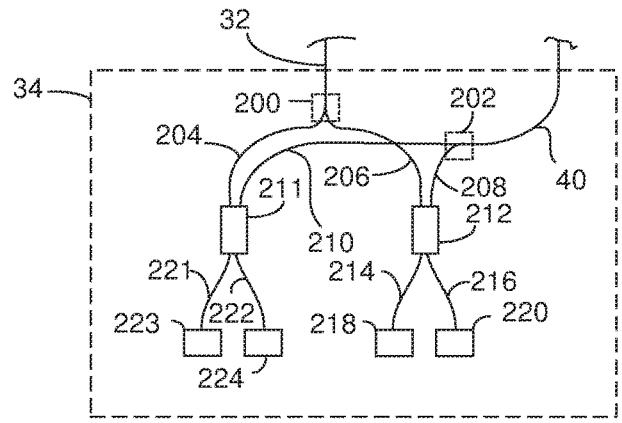
FIG. 7A illustrates an example of a processing unit suitable for use with the LIDAR system of FIG. 1A.
Figure 7B:
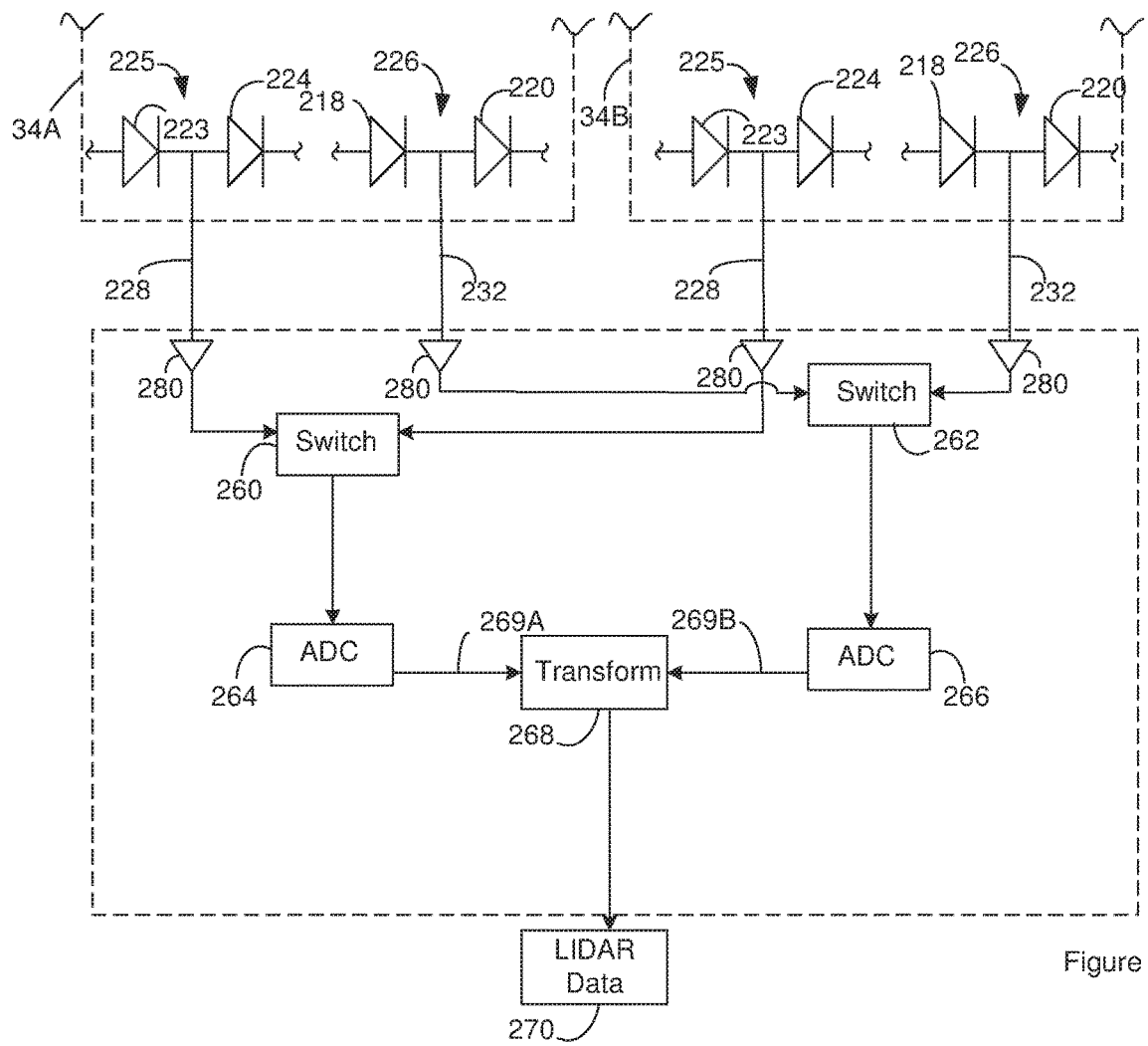
FIG. 7B provides a schematic of electronics that are suitable for use with a processing unit constructed according to FIG. 7A.

FIG. 7A through FIG. 7B illustrate an example of a suitable processing component 34 for use as each one of the processing components 34 in the above LIDAR assemblies. As described in the context of FIG. 1A, each processing component 34 receives a comparative signal from a comparative waveguide 32 and a reference signal from a reference waveguide 40. The processing unit includes a second splitter 200 that divides the comparative signal carried on the comparative waveguide 32 onto a first comparative waveguide 204 and a second comparative waveguide 206. The first comparative waveguide 204 carries a first portion of the comparative signal to a light-combining component 211. The second comparative waveguide 206 carries a second portion of the comparative signal to a second light-combining component 212.

The processing component includes a first splitter 202 that divides the reference signal carried on the reference waveguide 40 onto a first reference waveguide 210 and a second reference waveguide 208. The first reference waveguide 210 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second auxiliary light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

FIG. 7B provides a schematic of the relationship between the electronics and the light sensors from multiple different processing components. For instance, FIG. 7B illustrates a first one of the processing components 34A and a second one of the processing components 34B. In the first processing components 34A and the second processing component 34B, the symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 7B are included on the LIDAR chip. In some instances, the components illustrated in the schematic of FIG. 7B are distributed between the LIDAR chip and electronics located off of the LIDAR chip.

The processing units each receive comparative signals and reference signals that carry the same channel. Additionally, different processing units receive comparative signals and reference signals that carry different channels. For instance, the first processing unit 34A can receive the comparative signals and reference signals that carry a first channel ($\lambda_1$) and the second processing unit 34B can receive the comparative signals and reference signals that carry a second channel ($\lambda_2$). In these instances, LIDAR data generated from the first processing unit 34A is for a sample region that is illuminated by a system output signal carrying the first channel and LIDAR data generated from the second processing unit 34B is for a sample region that is illuminated by a system output signal carrying the second channel.

The electronics connect the first light sensor 223 and the second light sensor 224 from the same processing component 34 as a first balanced detector 225 and the first auxiliary light sensor 218 and the second auxiliary light sensor 220 from the same processing component as a second balanced detector 226. In particular, the first light sensor 223 and the second light sensor 224 in the same processing component are connected in series and the first auxiliary light sensor 218 and the second auxiliary light sensor 220 in the same processing component are connected in series. The serial connections in each of the first balanced detectors is in communication with a first data line 228 that carries the output from the first balanced detector as a first data signal. The serial connections in each of the second balanced detector is in communication with a second data line 232 that carries the output from the second balanced detector as a second data signal. The first data signals are each an electrical representation of a first composite signal and the second data signals are each an electrical representation of one of the second composite signals. Accordingly, the first data signals each includes a contribution from a first waveform and a second waveform and the second data signal is a composite of the first waveform and the second waveform. The portion of the first waveform in a first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. Each of the first data signals and the second data signals are beating as a result of the beating between one of the comparative signal and the associated reference signal, i.e. the beating in the first composite signal and in the second composite signal.

The electronics 62 include a transform mechanism 238 configured to perform a mathematical transform on each of the associated pairs of first data signals and second data signals. An associated pair is the first data signals and the second data signal from the same processing component. The mathematical transform can be a complex Fourier transform with a first data signal and the associated second data signal as inputs. Since a first data signal is an in-phase component and the associated second data signal its quadrature component, the first data signal and the associated second data signal together act as a complex data signal where the first data signal is the real component and the associated second data signal is the imaginary component of the input.

The transform mechanism 238 includes one or more switches that each receives data signals from multiple different processing units. For instance, the transform mechanism 238 includes a first switch 260 that receives the first data signal from the first data line 228 of the first processing unit 34A and the first data signal from the first data line 228 of the second processing unit 34B. The electronics can operate the first switch 260 such that the first switch 260 outputs the first data signal from the first processing unit 34A or the first data signal from the second processing unit 34B. The transform mechanism 238 includes a second switch 262 that receives the second data signal from the second data line 232 of the first processing unit 34A and the second data signal from the second data line 232 of the second processing unit 34B. The electronics can operate the second switch 262 such that the second switch 262 outputs the second data signal from the first processing unit 34A or the second data signal from the second processing unit 34B. Suitable switches for the first switch 260 and/or the second switch 262 include, but are not limited to, analog switches such as GaAs MMICs (Monolithic Microwave Integrated Circuits), for example HMC545A from Analog Devices, and combined transimpedance amplifier (TIA) and multiplexer integrated circuits such as the 4-channel LTC6561 from Analog Devices.

The electronics operate the first switch 260 and the second switch 262 such that the first switch 260 and the second switch 262 concurrently outputs data signals from the same processing unit. For instance, the electronics can operate the first switch 260 and the second switch 262 in a first mode where the first switch 260 outputs the first data signal from the first processing unit 34A and the second switch 262 outputs the second data signal from the first processing unit 34A. Alternately, the electronics can operate the first switch 260 and the second switch 262 in a second mode where the first switch 260 outputs the first data signal from the second processing unit 34B and the second switch 262 outputs the second data signal from the second processing unit 34B. Accordingly, the data signals that are output from the first switch 260 and the second switch 262 are output from the first processing unit 34A or from the second processing unit 34. As a result, the data signals output from the first switch 260 and the second switch 262 carry either the first channel or carry the second channel.

The transform mechanism 238 includes a first Analog-to-Digital Converter (ADC) 264 that receives the first data signal output from the first switch 260. Accordingly, the first Analog-to-Digital Converter (ADC) 264 receives the first data signal output from the first processing unit 34A or the second processing unit 34B depending on whether the first switch 260 is being operated in the first mode or the second mode. The first Analog-to-Digital Converter (ADC) 264 converts the first data signal from an analog form to a digital form and outputs a first digital data signal.

The transform mechanism 238 includes a second Analog-to-Digital Converter (ADC) 266 that receives the second data signal from the second switch 262. Accordingly, the second Analog-to-Digital Converter (ADC) 266 receives the second data signal output from the first processing unit 34A or the second processing unit 34B depending on whether the second switch 262 is being operated in the first mode or in the second mode. The second Analog-to-Digital Converter (ADC) 266 converts the second data signal from an analog form to a digital form and outputs a second digital data signal.

The first digital data signal is a digital representation of the first data signal and the second digital data signal is a digital representation of the second data signal. Accordingly, the first digital data signal and the second digital data signal from the same processing unit act together as a complex signal where the first digital data signal acts as the real component of the complex signal and the second digital data signal acts as the imaginary component of the complex data signal. Because the first switch 260 and the second switch 262 concurrently outputs data signals from the same processing unit, each complex data signal carries data from a particular one of the processing units and accordingly of a particular channel.

The transform mechanism 238 includes a transform component 268 that receives the complex data signal. For instance, the transform component 268 receives the first digital data signal from the first Analog-to-Digital Converter (ADC) 264 on a first common line 269A as an input and also receives the associated second digital data signal from the second Analog-to-Digital Converter (ADC) 266 on a second common line 269A as an input. As will become evident below, each of the data signals received by the transform component 268 can carry multiple different channels in series. As a result, each of the common lines carries signals that carry different channels. Suitable lines for the electronics include, but are not limited to, electrical conductors such as metal traces, and wires.

The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of the comparative signal relative to the system output signal (the beat frequency) that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR system). Because the complex data signal received by the transform component 268 carries data from a particular one of the processing units, the frequency peaks and resulting LIDAR data correspond to that particular processing unit and to the channel processed by the processing unit. The transform component 268 can execute the attributed functions using firmware, hardware or software or a combination thereof.

Figure 7C:
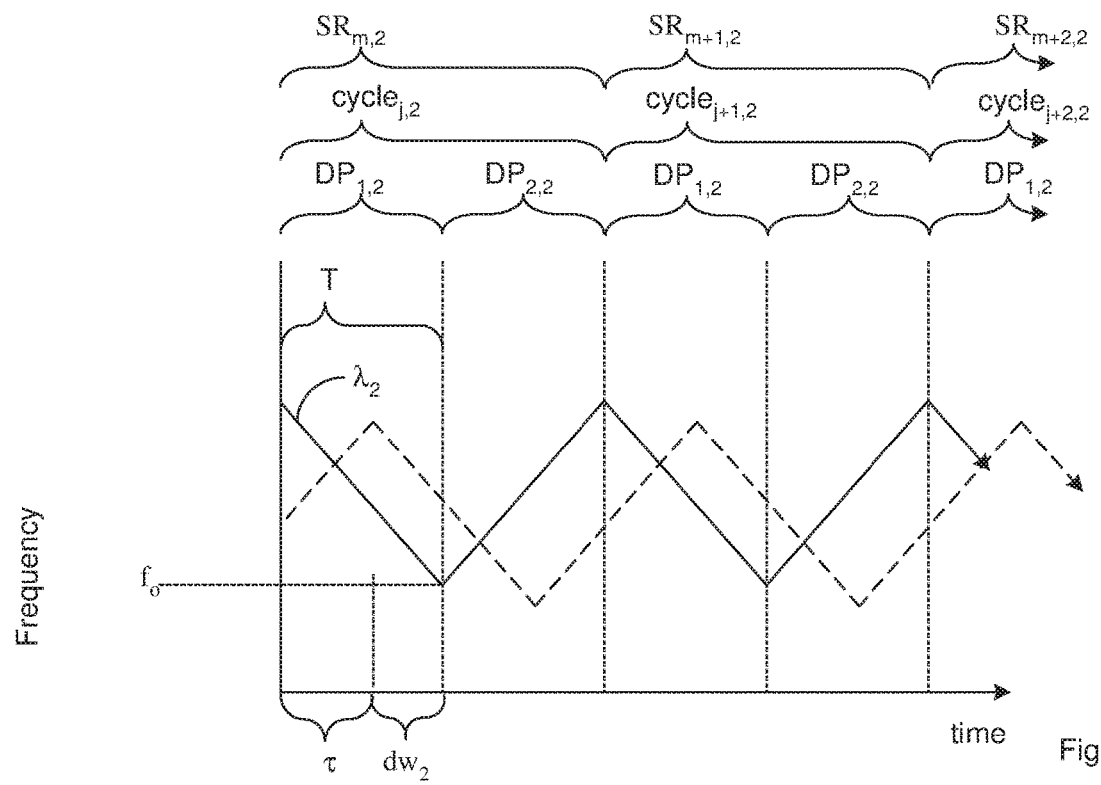
FIG. 7C is a graph of frequency versus time for one of the channels included in a LIDAR output signal.

The electronics include a LIDAR data generator 270 that receives the beat frequencies output from the transform component 268. The LIDAR data generator 270 uses these beat frequencies in combination with the frequency pattern of the system output signals to generate the LIDAR data. FIG. 7C has a solid line that shows an example of a suitable frequency pattern for the system output signal and accordingly for the reference signal. The illustrated system output signal and reference signal are carrying channel $\lambda_1$ where i represents a channel index. The illustrated channel is channel i=2 and is accordingly labeled $\lambda_2$. FIG. 7C also has a dashed line that shows the frequency pattern for the system return signal that results from reflection of the system output signal by an object. Accordingly, the dashed line also shows the frequency pattern for the comparative signal carrying channel $\lambda_2$.

FIG. 7C shows the frequency versus time pattern over a sequence of two cycles labeled $cycle_j$ and $cycle_{j+1}$. In some instances, the frequency versus time pattern is repeated in each cycle as shown in FIG. 7C. The illustrated cycles do not include re-location periods and/or re-location periods are not located between cycles. As a result, FIG. 7C illustrates the results for a continuous scan.

Each cycle includes K data periods that are each associated with a period index k and are labeled $DP_{k,i}$ where i represents a channel index. In the example of FIG. 7C, each cycle includes two data periods (with k=1 and 2). Since FIG. 7C illustrates the frequency pattern for channel index i=2, each cycle includes two data periods labeled $DP_{k,2}$ with k=1 and 2. In some instances, the frequency versus time pattern is the same for the data periods that correspond to each other in different cycles as is shown in FIG. 7C. Corresponding data periods are data periods with the same period index. As a result, each data period DP can be considered corresponding data periods for that same channel index (i) and the associated frequency versus time patterns are the same in FIG. 7C. At the end of a cycle, the electronics return the frequency to the same frequency level at which it started the previous cycle.

During each data period, the frequency of the system output signal is varied at a constant rate. The rate can be zero but at least a portion of the data periods in each cycle have the system output signal varied at a non-zero rate. The direction and/or rate of the frequency change changes at the change of data periods from the same cycle. For instance, during the data period $DP_{1,i}$ and the data period $DP_{2,i}$, the electronics operate the light source such that the frequency of the system output signal changes at a linear rate α. The direction of the frequency change during the data period $DP_{1,i}$ is the opposite of the direction of the frequency change during the data period $DP_{2,i}$.

The solid line in FIG. 7C can represent the frequency pattern of the system output signal at the time that the system output signal exits from the LIDAR system and the dashed line can represent the frequency pattern of the system return signal at the time that the system return signal enters the LIDAR system. Since the light from the system output signal has taken a round trip from the LIDAR system, to an object, and back to the LIDAR system, there is a delay labeled τ between the system output signal exiting from the LIDAR system and the reflected light returning to the LIDAR system in the system return signal. The duration of the data periods is labeled T. In some instances, the duration of the data period (T) can represent the largest round trip time for which the LIDAR system can provide reliable LIDAR data.

As is evident in FIG. 7C, there is a window of time where light from a system output signal that is output during a particular data period and returns to the LIDAR system within the same data period. This data window can be represented by $dw_i$ where i represents the channel index. In the FIG. 7C data period labeled $DP_{1,2}$, the data window is labeled $dw_2$. The beat frequency that occurs during the data window can be used to generate LIDAR data. However, as will become evident below, the beat frequency during only a portion of the available data window can be used to generate LIDAR data. In some instances, the beat frequency during the data windows of multiple different data periods can be combined to generate the LIDAR data for a cycle and/or for a sample region.

As shown in FIG. 7C, the duration of the data window can be represented by T-τ. The value of the round trip time (τ) between the LIDAR system and an object can vary as a result of changes to the distance between the LDIAR system and an object. This change to the roundtrip time results in a change to the duration of the data window. However, the data window extends to the end of the data period. Accordingly, when a data period has a data window ($dw_2$), the data window extends to the end of the data period.

As will be described in more detail below, the electronics operate the switches such that the transform component 268 receives the data signals that were generated from composite signals that occurred during the data window. As a result, the beat frequency output from the Complex Fourier transform represents the beat frequency of the composite signals that each includes light from a comparative signal beating against light from a reference signal. The beat frequencies ($f_{LDP}$) from two or more different data periods from the same cycle and with the same channel index can be combined to generate the LIDAR data. For instance, the beat frequency determined from $DP_{1,2}$ in $cycle_{j,2}$ of FIG. 7C can be combined with the beat frequency determined from $DP_{2,2}$ in $cycle_{j,2}$ of FIG. 7C to determine the LIDAR data. During a cycle, a sample region is illuminated by a system output signal. Accordingly, the LIDAR data for a sample region is for one or more objects located in the sample region. The sample regions that are illuminated during a cycle are labeled for sample region $SRA_{M,i}$ in FIG. 7C where M represents a sample region index and i represents the channel index. Since FIG. 7C illustrates a frequency pattern for channel i=2, FIG. 7C shows a series of three sample regions labeled $SR_{M,2}$ through $SR_{M+2,2}$. The LIDAR data generated from $cycle_{j,2}$ is for one or more object located in sample region $SR_{M,2}$.

As noted above, the LIDAR data generator can combine beat frequencies ($f_{LDP}$) from different data periods in the same cycle with the same channel index to generate the LIDAR data. For instance, the LIDAR data for sample region $SR_{M,2}$ can be generated from the data periods $DP_{1,2}$ and $DP_{2,2}$ in $cycle_{j,2}$. The following equation applies during a data period where electronics increase the frequency of the system output signal during the data period such as occurs in data period $DP_{1,2}$ of FIG. 7C: $f_{ub}=-f_d+\alpha\tau$ where $f_{ub}$ is the beat frequency provided by the transform component, $f_d$ represents the Doppler shift ($f_d=2vf_c/c$) where $f_c$ represents the optical frequency ($f_o$), c represents the speed of light, v is the radial velocity between a reflecting object and the LIDAR system where the direction from the reflecting object toward the chip is assumed to be the positive direction, and c is the speed of light. The following equation applies during a data period where electronics decrease the frequency of the outgoing LIDAR signal such as occurs in data period $DP_{2,2}$ of FIG. 7C: $f_{db}=-f_d-\alpha\tau$ where $f_{db}$ is a beat frequency provided by the transform component. In these two equations, $f_d$ and $\tau$ are unknowns. When these equations are solved for the two unknowns, the radial velocity for the sample region can be determined from the Doppler shift ($v=c*f_d/(2f_c)$) and/or the separation distance for that sample region can be determined from $c*f_d/2$. Suitable LIDAR data generators include, but are not limited to, Digital Signal Processors (DSPs).

The electronics operate the switches such that one or more series processing components of the electronics receive data signals from different processing units 34 in series. For instance, the electronics can operate the switches such that the transform component 268 receives data signals in a pattern that repeats receiving data signals from the first processing unit 34A followed by data signals from the second processing unit 34A. Since different processing units receive signals that carry different channels, the transform component 268 outputs a series of beat frequencies that alternate beat frequencies for the first channel with beat frequencies for the second channel. Additionally or alternately, the LIDAR data generator 270 can receive the beat frequencies output from the transform component 268 such that beat frequencies for different channels are received serially. As a result, the LIDAR data generator 270 can generate LIDAR data serially. For instance, the LIDAR data generator 270 can output LIDAR data results that provide LIDAR data in a pattern that repeats outputting LIDAR data for the first channel followed by LIDAR data for the second channel. Since the transform components 268 and/or the LIDAR data generator 270 process data for multiple different channels, the number of transform components 268 and/or the LIDAR data generators 270 can be less than the number of system output signals that are output from the LIDAR system.

The LIDAR system can include one or more delay mechanisms that cause series processing components to receive data signals from different processing units 34 in series. Accordingly, the one or more delay mechanisms can cause the series processing component(s) to serially receive data signals that carry different channels. The delay mechanism can be optical, mechanical, or electrical. One example of an optical delay mechanism is the electronics operating the light source 10 such that the frequency versus time pattern of one system output signal is delayed relative to another. As an example, FIG. 7D includes solid lines that illustrate the frequency versus time patterns for the system output signals carrying different channels. The system output signals carrying different channels have the frequency versus time pattern but the patterns are shifted relative to one another in time. For instance, the system output signals carrying different channels have the same rate of frequency change as a function of the data periods but at least one of the system output signals is delayed relative to another system output signal by an amount labeled "dy."

Figure 7D:
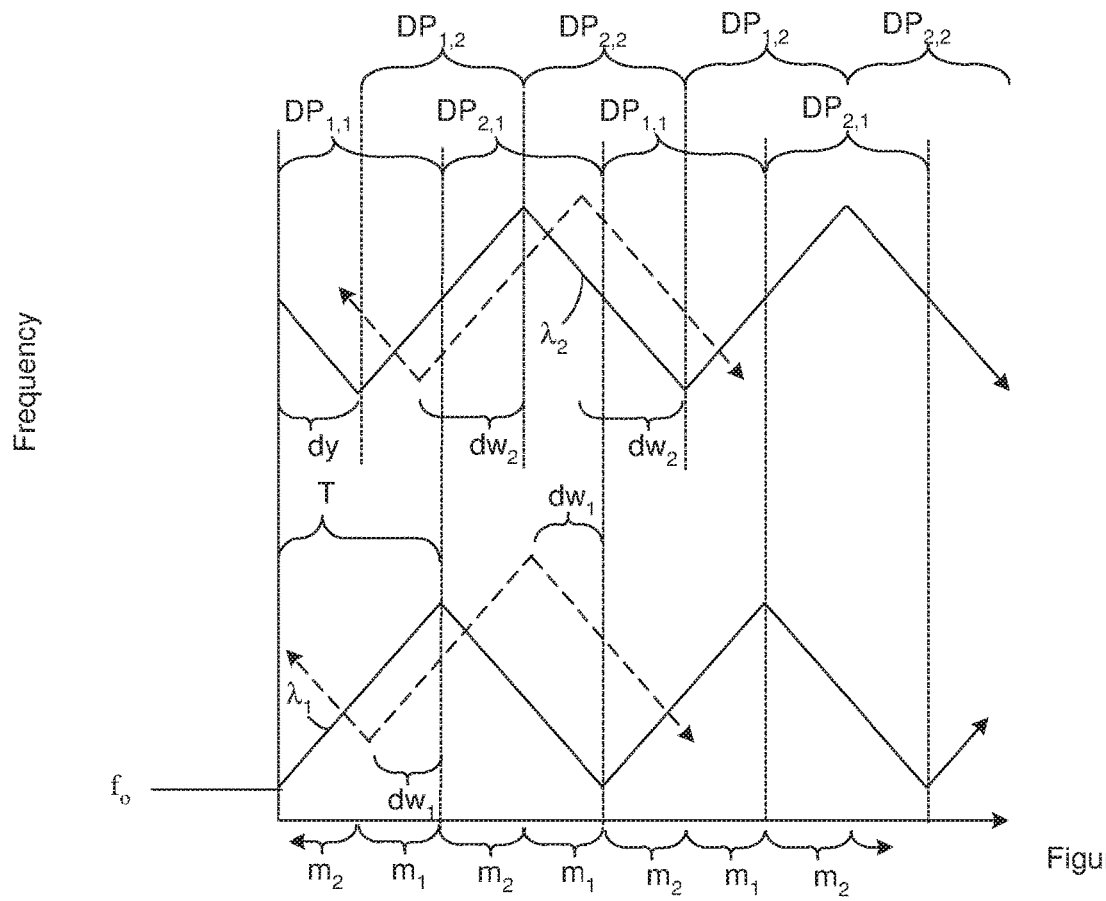
FIG. 7D is a graph of frequency versus time for multiple channels included in an outgoing LIDAR signal.

FIG. 7D also includes a dashed line that illustrates a portion of a possible frequency versus time pattern for the system return signal that results from the system output signal that carries channel 1 and is output during the data period labeled $DP_{1,1}$. FIG. 7D also includes a dashed line that illustrates a portion of a possible frequency versus time pattern for the system return signal that results from the system output signal that carries channel 2 and is output during the data period labeled $DP_{1,2}$. The data windows that result from the illustrated system return signals are also shown. The data window for channel 1 is labeled $dw_1$ and the data window for channel 2 is labeled $dw_2$. In FIG. 7D, the data window for channel 1 ($dw_1$) and the data window for channel 2 ($dw_2$) overlap in time; however, this overlap is often not present. However, the system output signals are delayed such that a portion of the data window for channel 1 ($dw_1$) and the data window for channel 2 ($dw_2$) do not overlap in time.

As noted above, the electronics operate the switches such that the transform component 268 receives the data signals from the same processing unit. As a result, the transform component 268 receives the data signals that carry the same channel. The electronics also operate the switches such that transform component 268 receives data signals that carry different channels in series. For instance, as shown in FIG. 7D, the electronics can operate the switches such that transform component 268 receives the data signals that carry light from the beating signals generated during the data windows in the following sequence: $dw_1$ of $DP_{1,1}$; followed by $dw_2$ of $DP_{1,2}$; followed by $dw_1$ of $DP_{2,1}$; followed by $dw_2$ of $DP_{2,2}$; and so on. Accordingly, the transform component 268 can determine and/or output the beat frequencies in the following sequence: beat frequency of the data signal during $dw_1$ of $DP_{1,1}$; followed by beat frequency of the data signal during $dw_2$ of $DP_{1,2}$; followed by beat frequency of the data signal during $dw_1$ of $DP_{2,1}$; followed by beat frequency of the data signal during $dw_2$ of $DP_{2,2}$; and so on. Accordingly, the transform component 268 determines and/or output beat frequencies for different channels in series. As a result, the transform component 268 determines and/or output beat frequencies in a pattern that repeats determining and/or outputting one or more beat frequencies for channel 1 followed by one or more beat frequencies for channel 2.

The LIDAR data generator 270 can combine the beat frequencies from $dw_1$ of $DP_{1,1}$ and $dw_1$ of $DP_{2,1}$ to generate LIDAR data as disclosed above followed by combining the beat frequencies from $dw_2$ of $DP_{1,2}$ and $dw_2$ of $DP_{2,2}$ to generate LIDAR data as disclosed above, and so on. Accordingly, the transform component 268 determines and/or outputs LIDAR data for different channels in series. For instance, the LIDAR data generator 270 determines and/or outputs LIDAR data in a pattern that repeats determines and/or outputs LIDAR data from channel 1 followed by LIDAR data from channel 2.

Operating the switches (the first switch 260 and the second switch 262) such that the transform component 268 serially receives data signals that carry different channels can be performed by operating the switches such that operating the switches in the first mode (labeled $m_1$ in FIG. 7D) is alternated with operating the switches in the second mode (labeled $m_2$ in FIG. 7D) as illustrated along the x-axis of FIG. 7D. Each of the first mode ($m_1$) operations at least partially overlaps in time a data window labeled $dw_1$. For instance, at least a portion of each data window labeled $dw_1$ occurs concurrently with one of the first mode operations. As a result, the transform component 268 receives the data signals generated during at least a portion of the data window labeled $dw_1$. Accordingly, the transform component 268 outputs one or more beat signals determined from beating signals generated during each of the channel 1 data windows. Additionally, each of the second mode ($m_2$) operations at least partially overlaps in time a data window labeled $dw_2$. For instance, at least a portion of each data window labeled $dw_2$ occurs concurrently with one of the second mode operations. As a result, the transform component 268 receives the data signals generated during at least a portion of the data window labeled $dw_2$. Accordingly, the transform component 268 outputs one or more beat signals determined from beating signals generated during each of the channel 2 data windows. Since the switch modes are each associated with a different channel and alternate in time, the transform component 268 serially determines and/or serially outputs beat frequencies for channels that alternate in time.

In some instance, the overlap in time between the mode of switch operation and the data windows is achieved by extending the duration of the mode operation up to or beyond the change in data periods. Accordingly, the mode of switch operations can extend up to or beyond a point where the direction and/or rate of frequency change of the associated system output signal occurs. As noted above, each data window can extend to the end of a data period. Extending the mode operation up to or beyond the change in data periods can help ensure that the data signals that are transmitted to the transform component 268 during a particular mode of operation include data signals that were generated within a data window. In some instances, the switch operation modes extend beyond the change in data periods by less than 5%, 10%, or 20% of the duration of the data period.

Although FIG. 7B through FIG. 7D are disclosed in the context of series processing components that receive two channels, one or more series processing components can be configured to receive signals that carry more than two channels. For instance, the transform component 268 and/or the LIDAR data generator 270 can receive signals that carry two or more different channels. In some instances, the delay (dy) is equal to T/N where N represents the number of different channels for which the transform component 268 determines and/or outputs beat signal frequencies and/or the number of processing units 34 from which the transform component 268 receives beating signals. In these instances, the duration of each switch mode operation can be equal to T/N.

The delay between system output signals shown in FIG. 7D can be achieved by independently operating the laser sources in a light source constructed according to FIG. 1B. Additionally or alternately, the delay can be achieved by elongating a waveguide that carries one channel relative to a waveguide that carries another channel. For instance, a source waveguide 70 can be longer than another of the source waveguides 70 and the length differential can be sufficient to provide the desired delay.

Figure 8A:
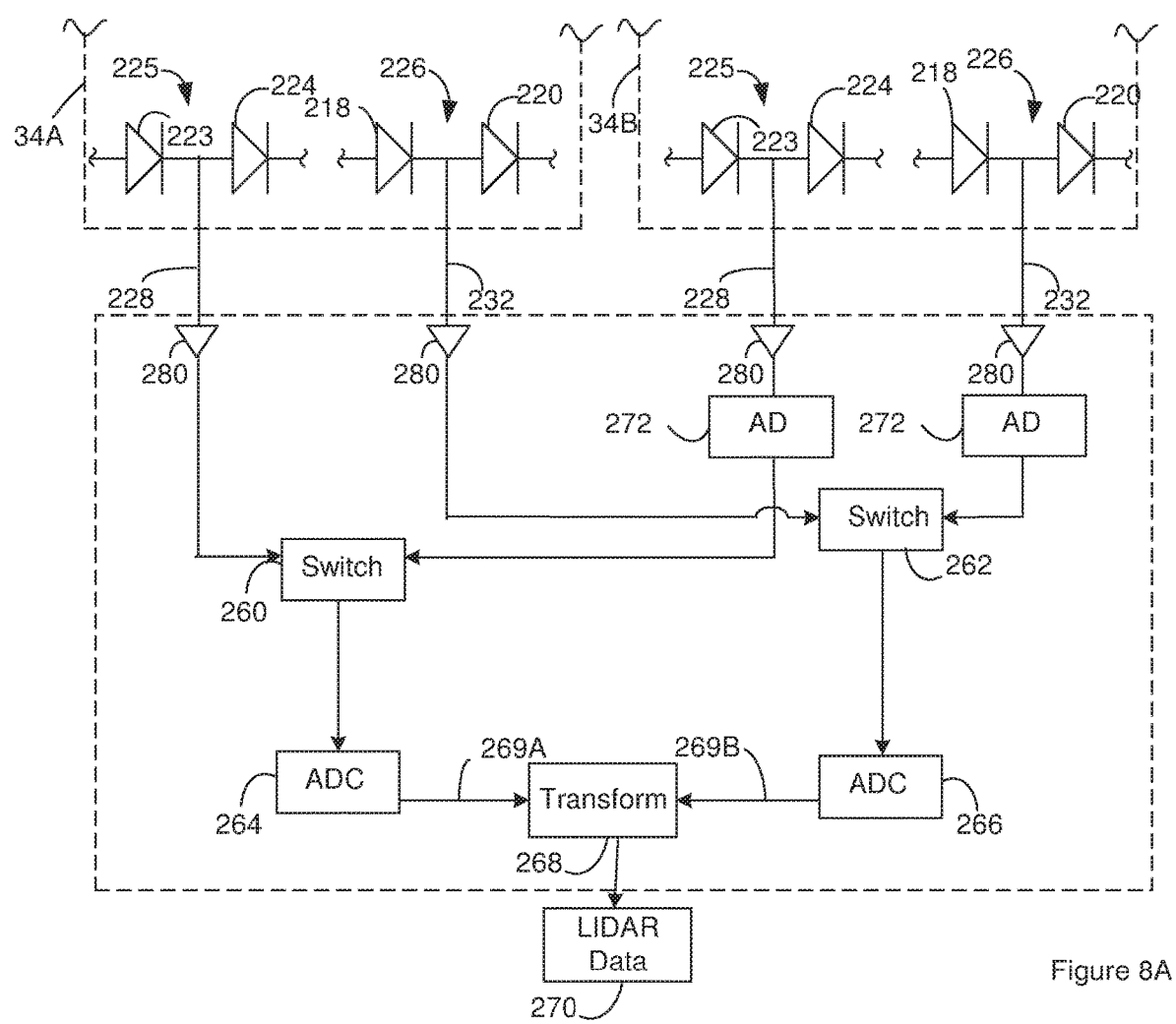
FIG. 8A is a schematic of electronics that are suitable for use with a processing unit constructed according to FIG. 7A.

The delay mechanism disclosed in the context of FIG. 7B through FIG. 7D is an optical delay mechanism, however, the delay mechanism can be electrical. FIG. 8A provides a schematic of electronics that include an electrical delay mechanism and are suitable for use with a processing unit constructed according to FIG. 7A. The electronics of FIG. 8A show the electronics of FIG. 7B modified to include an electrical delay 272 between the first balanced detector 225 of the second processing component 34B and the first switch 260. Accordingly, the electrical delay 272 is positioned to receive the first data signal from the first data line 228 of the second processing unit 34B. Another electrical delay 272 is positioned between the second balanced detector 226 of the second processing components 34B and the second switch 262. Accordingly, the delay is positioned to receive the second data signal from the second data line 232 of the second processing unit 34B.

The electrical delays 272 create a time delay between the electrical delay 272 receiving a data signal and outputting the data signal. The level of time delay provided by the different electrical delays 272 can be the same. Electrical delays 272 are not present between the first processing component 34A and the switches. As a result, the electrical delays 272 delay the time that the data signals from the second processing unit 34B are received at the switches relative to the time the data signals from the first processing unit 34A are received at the switches. Accordingly, when data signals are output from the first processing unit 34A and the second processing unit 34B at the same time, the data signals from the second processing unit 34B are received after the data signals from the first processing unit 34A. Suitable electrical delays 272 include, but are not limited to, analog delays, transmission lines, surface acoustic waves, and series RC circuit delay lines.

Figure 8B:
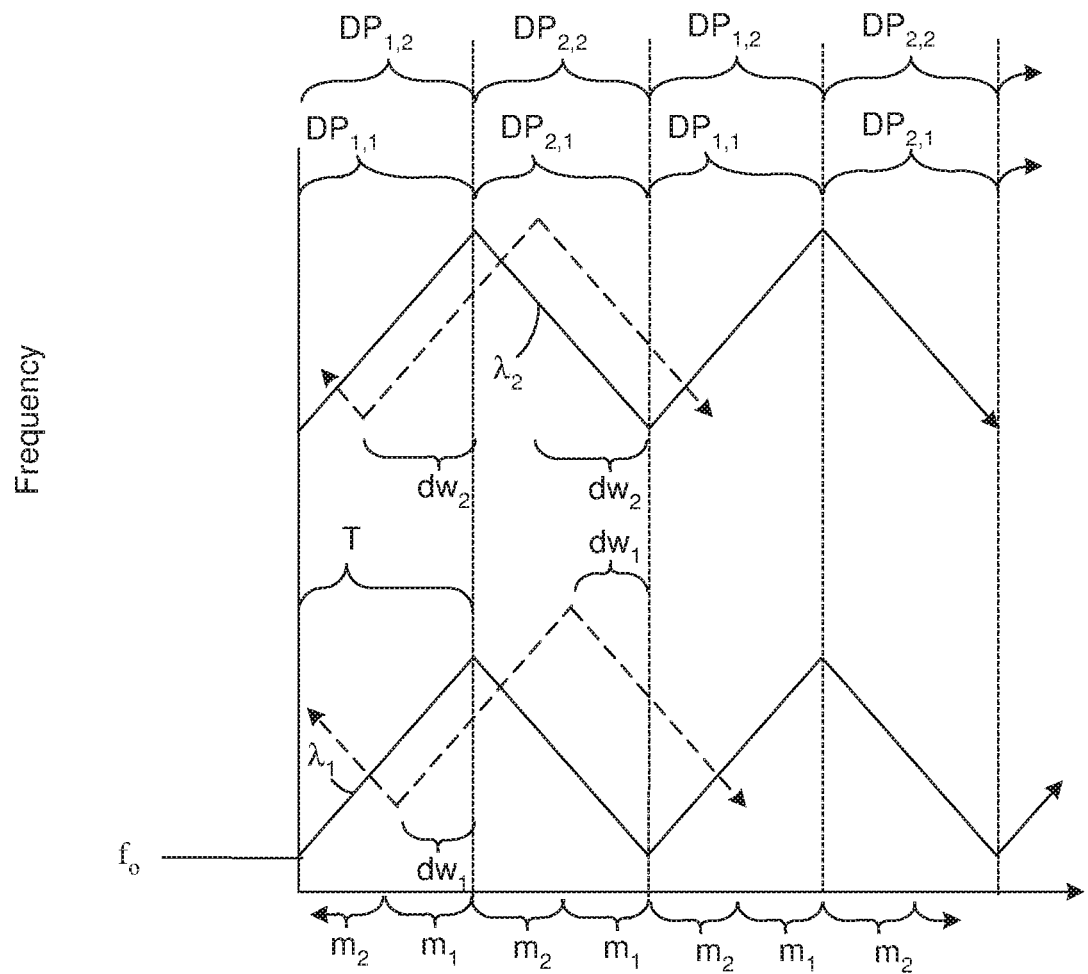
FIG. 8B is a graph of frequency versus time for multiple channels included in an outgoing LIDAR signal.

The electronics of FIG. 8A can be used with the system output signals having a frequency versus time pattern configured as shown in FIG. 8B. FIG. 8B includes the frequency versus time patterns of FIG. 7D modified such that the frequency versus time patterns are not delayed relative to one another. For instance, the amount of the delay labeled "dy" in FIG. 7D is equal to zero. This configuration can reduce the complexity of the light source construction and/or operation. For instance, the light source can be a single comb laser, that the electronics operate so as to achieve the frequency versus time patterns of FIG. 8B.

The switches are operated such that the transform component 268 serially receives data signals that carry different channels. This result can be achieved by operating the switches such that operating the switches in the first mode (labeled $m_1$ in FIG. 8B) is alternated with operating the switches in the second mode (labeled $m_2$ in FIG. 8B) as illustrated along the x-axis of FIG. 8B. In FIG. 8B, each of the first mode ($m_1$) operations at least partially overlaps in time a data window labeled $dw_1$ and also a data window labeled $dw_2$. For instance, at least a portion of each data window labeled $dw_1$ occurs concurrently with one of the first mode operations and at least a portion of each data window labeled $dw_2$ occurs concurrently with one of the first mode operations. During the first mode ($m_1$), the switches direct the data signals from the first processing unit 34A to transform component 268. Since there is not a delay between the first processing unit 34A and the transform component 268 and since each of the first mode ($m_1$) operations overlaps in time a data window labeled $dw_1$, the transform component 268 receives the data signals generated during at least a portion of the data window labeled $dw_1$ during the first modes ($m_1$). Accordingly, during the first modes the transform component 268 outputs one or more beat signals determined from beating signals generated during each of the channel 1 data windows.

During the second modes ($m_2$), the switches direct the data signals from the second processing unit 34A to transform component 268. However, the electrical delays 272 increase the time required for the data signals to travel from the second processing unit 34A to transform component 268. The amount of the delay can be selected such that at least a portion of the data signals output from the second processing unit 34A during the previous first mode ($m_2$) are received at the transform component 268 during the second modes ($m_2$). For instance, when the amount of time delay provided by the electrical delays 272 is greater than or equal to the duration of the first modes, the data signals output from a second processing unit 34B at the beginning of a first mode ($m_1$) do not arrive at the switches from the electrical delays 272 until after the first mode has expired. As a result, these data signals from the first mode ($m_1$) arrive at the switches during the second mode ($m_2$). Accordingly, the digital data signals received by the switches during the first mode and the second mode represent the data signals that occur the first mode of switch operation.

Since each of the each of the first mode ($m_1$) operations at least partially overlaps in time a data window labeled $dw_2$, the data signals that arrive at the transform component 268 during the second mode were generated during at least a portion of the data window labeled $dw_2$ in the first modes ($m_1$). Accordingly, during the second modes, the transform component 268 outputs one or more beat signals determined from beating signals generated during each of the channel 2 data windows.

Although FIG. 8A through FIG. 8B are disclosed in the context of series processing components that receive two channels, one or more series processing components can be configured to receive signals that carry more than two channels. For instance, the transform component 268 and/or the LIDAR data generator 270 can receive signals that carry two or more different channels. In these instances, the duration of each switch mode operation can be equal to T/N where N represents the number of different channels for which the transform component 268 determines and/or outputs beat signal frequencies and/or the number of processing units 34 from which the transform component 268 receives beating signals.

Figure 9:
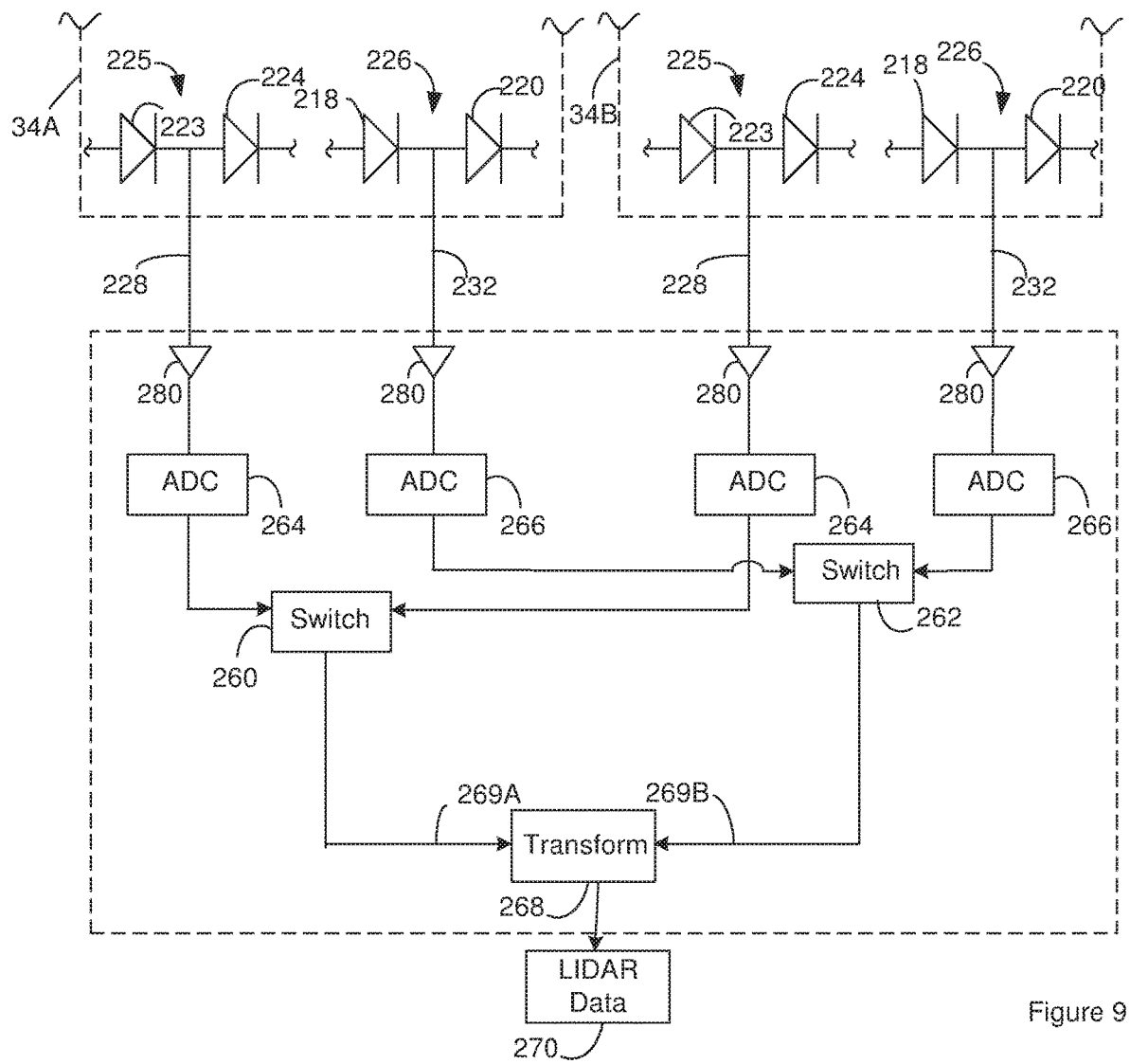
FIG. 9 is a schematic of electronics that are suitable for use with a processing unit constructed according to FIG. 7A.

FIG. 9 illustrates another example of electronics that include an electrical delay mechanism. FIG. 9 is a schematic of electronics that include an electrical delay mechanism and are suitable for use with a processing unit constructed according to FIG. 7A. Each of the data signals output by one of the light detectors is received at an Analog-to-Digital Converters (ADC). For instance, the transform mechanism 238 includes first Analog-to-Digital Converters (ADC) 264 that each receives a first data signal output from a first data line 228. The first Analog-to-Digital Converters (ADC) 264 each outputs a first digital data signal. The transform mechanism 238 also includes second Analog-to-Digital Converters (ADC) 264 that each receives a second data signal output from a second data line 232. The second Analog-to-Digital Converters (ADC) 264 each outputs a second digital data signal.

The transform mechanism 238 includes one or more switches that each receives digital data signals from multiple different processing units. For instance, the transform mechanism 238 includes a first switch 260 that receives the first digital data signal from the first data line 228 of the first processing unit 34A and the first digital data signal from the first data line 228 of the second processing unit 34B. The electronics can operate the first switch 260 such that the first switch 260 outputs the first digital data signal from the first processing unit 34A or the first data signal from the second processing unit 34B. The transform mechanism 238 includes a second switch 262 that receives the second data signal from the second data line 232 of the first processing unit 34A and the second data signal from the second data line 232 of the second processing unit 34B. The electronics can operate the second switch 262 such that the second switch 262 outputs the second data signal from the first processing unit 34A or the second data signal from the second processing unit 34B.

The electronics operate the first switch 260 and the second switch 262 such that the first switch 260 and the second switch 262 concurrently outputs digital data signals from the same processing unit. For instance, the electronics can operate the first switch 260 and the second switch 262 in a first mode where the first switch 260 outputs the first digital data signal from the first processing unit 34A and the second switch 262 outputs the second data signal from the first processing unit 34A. Alternately, the electronics can operate the first switch 260 and the second switch 262 in a second mode where the first switch 260 outputs the first digital data signal from the second processing unit 34B and the second switch 262 outputs the second data signal from the second processing unit 34B. Accordingly, the data signals that are output from the first switch 260 and the second switch 262 are output from the first processing unit 34A or from the second processing unit 34. As a result, the data signals output from the first switch 260 and the second switch 262 carry the first channel or carry the second channel.

The first digital data signal and the second digital data signal from the same processing unit act together as a complex signal where the first digital data signal acts as the real component of the complex signal and the second digital data signal acts as the imaginary component of the complex data signal. Because the first switch 260 and the second switch 262 concurrently outputs data signals from the same processing unit, each complex data signal carries data from a particular one of the processing units.

The transform mechanism 238 includes a transform component 268 that receives the complex data signal. As noted above, the transform component 268 is configured to output a signal that indicates the beat frequency of the data signals and accordingly of the composite signal. The LIDAR generate use the one or more beat frequencies to generate the LIDAR data (distance and/or radial velocity between the reflecting object and the LIDAR chip or LIDAR system) as disclosed above.

The frequency versus time patterns of FIG. 8B are suitable for use with the LIDAR system of FIG. 9. The switches can be operated in a repeated series that includes the first mode (labeled $m_1$ in FIG. 8B) followed by the second mode (labeled $m_2$ in FIG. 8B) as illustrated along the x-axis of FIG. 8B. As discussed in the context of FIG. 8B, each of the first mode ($m_1$) operations at least partially overlaps in time a data window labeled $dw_1$ and also a data window labeled $dw_2$. For instance, at least a portion of each data window labeled $dw_1$ occurs concurrently with one of the first mode operations and at least a portion of each data window labeled $dw_2$ occurs concurrently with one of the first mode operations.

As is evident from FIG. 9, the switches concurrently receive digital data signals from the first processing unit 34A and also from the second processing unit 34B. The switches can be configured such that during the first mode, the switches store the digital data signals from the second processing unit 34B but output the digital data signals from the first processing unit 34A. Additionally, the switches can be digital switches configured such that during the second mode, the switches store the digital data signals from the first processing unit 34A but the digital data signals that were stored during the first mode. As a result, the digital data signals output from the switches during the first mode and the second mode are the digital data signals from the first mode of switch operation. Since the digital data signals output from the switches during the first and second modes represent the digital data signals from the first mode of switch operation and since the each of the first mode ($m_1$) operations at least partially overlaps in time data windows labeled $dw_1$ and $dw_2$, the transform component 268 receives the digital data signals generated during the data windows labeled $dw_1$ during the first modes and receives the digital data signals generated during the data windows labeled $dw_2$ during the second modes. Accordingly, the transform component 268 receives the digital data signals that carry different channels in series. As a result, the LIDAR data generator can also serially receive the beat frequencies for digital data signal that carry different channels in series.

The storage of digital data signals can be achieved by storage mechanisms including, but not limited to, buffering. Suitable switches for the first switch 260 and/or the second switch 262 include, but are not limited to, digital switches that include access to memory.

Although FIG. 9 is disclosed in the context of series processing components that receive two channels, one or more series processing components can be configured to receive signals that carry more than two channels. For instance, the transform component 268 and/or the LIDAR data generator 270 can receive signals that carry two or more different channels. In these instances, the duration of each switch mode operation can be equal to T/N where N represents the number of different channels for which the transform component 268 determines and/or outputs beat signal frequencies and/or the number of processing units 34 from which the transform component 268 receives beating signals.

Figure 10A:
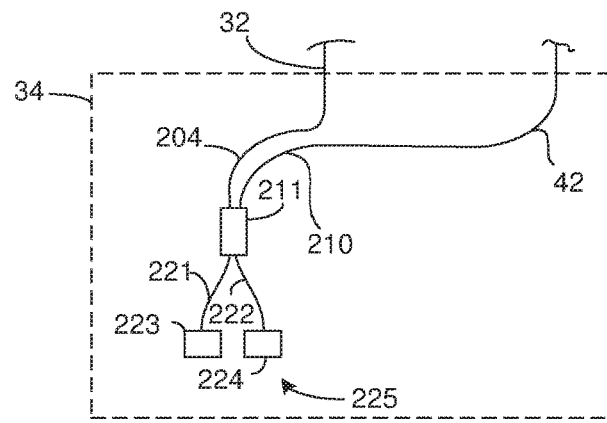
FIG. 10A illustrates an example of a processing unit suitable for use with the LIDAR system of FIG. 1A.
Figure 10B:
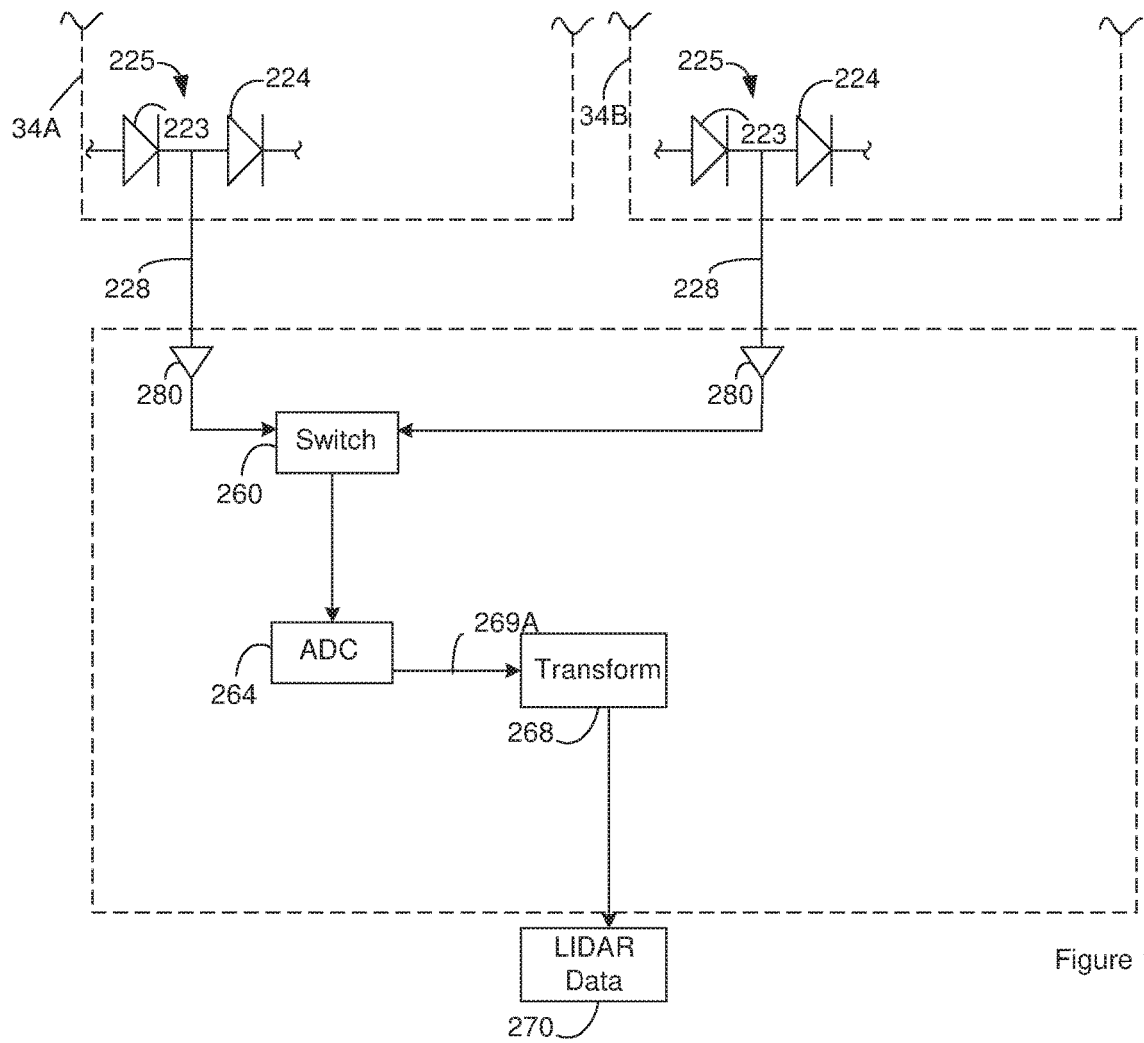
FIG. 10B is a schematic of electronics that are suitable for use with a processing unit constructed according to FIG. 10A.

Although the series processing components are disclosed as receiving multiple data signals, one or more of the series processing components can receive one or more data signals. As an example, FIG. 10A through FIG. 10B illustrate the processing unit of FIG. 7A and the electronics of FIG. 7B modified fur use with a transform component 268 that receives a single data signal. FIG. 10A illustrates an example of a processing unit suitable for use with the LIDAR system of FIG. 1A. FIG. 10B provides a schematic of electronics that are suitable for use with a processing unit constructed according to FIG. 10A. The processing unit excludes the second light-combining component 212 and accordingly outputs only the first electrical signal and the second electrical signal that are received by the first switch. As a result, the first data signal is the only data signal received by the transform component 268. The transform component can perform a real Fourier transform on the first data signal and can output a signal indicating the beat frequency of the first data signal. The frequency versus time pattern for the system output signals can be according to FIG. 7D. As a result, the LIDAR data generator can use the beat signal indicated by the transform component 268 to serially generate LIDAR data for different channels as disclosed above. The use of a real Fourier transform can also be applied to the electronics of FIG. 8A and FIG. 9 to permit the transform component 268 to receive a single data signal and/or to reduce the number of components such all or a portion of the components selected from the group consisting of the second light-combining component 212, second switch 262, one or more second Analog-to-Digital Converters (ADC) 266, and an electrical delay 272.

As shown in FIG. 7B, FIG. 8A, FIG. 9, and FIG. 10B, the lines that carry the data signals can optionally include amplifiers 280. Suitable amplifiers 280 include, but are not limited to, transimpedance amplifiers (TIAs).

Figure 11:
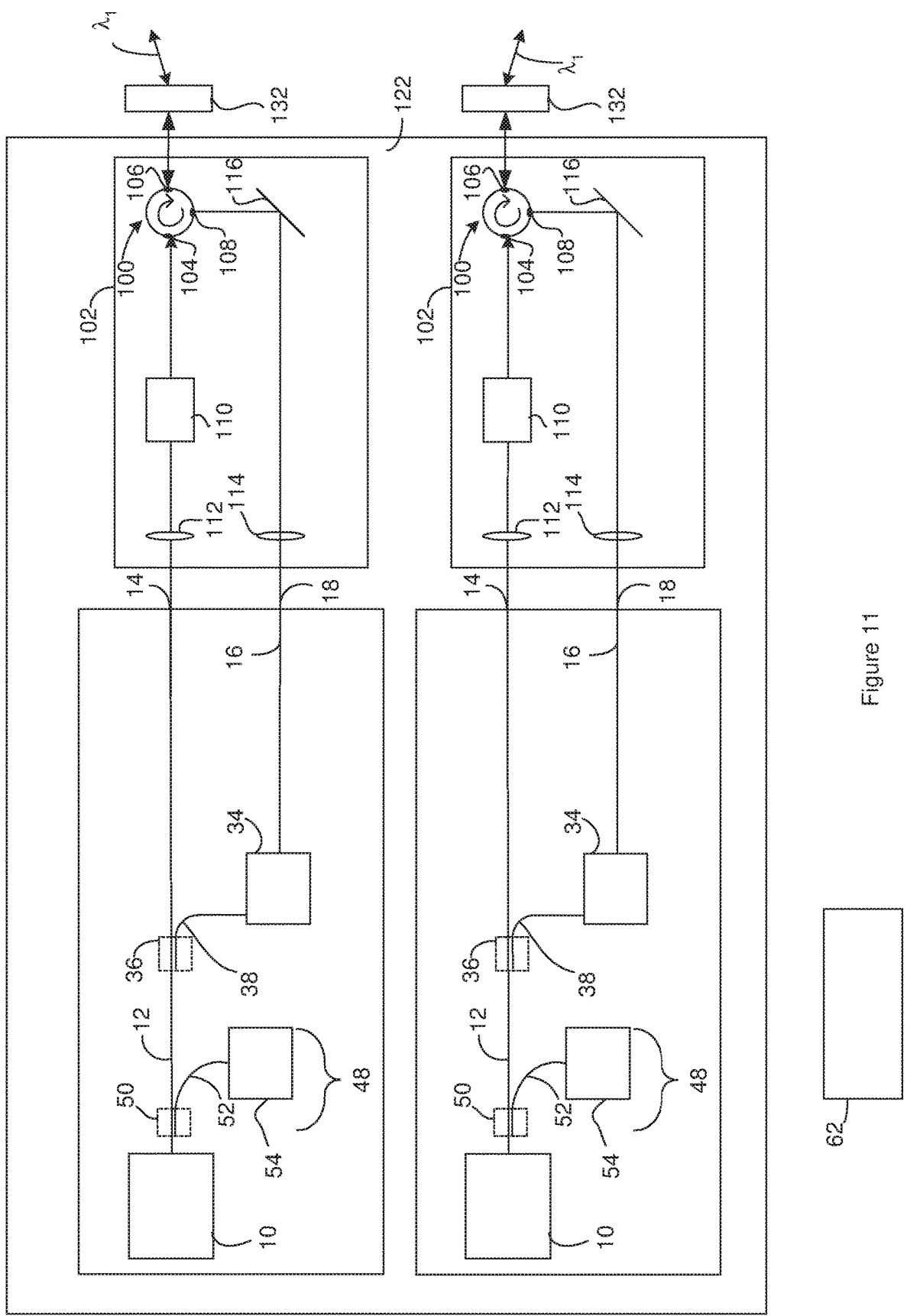
FIG. 11 is a topview of a LIDAR assembly that includes multiple LIDAR chips and adapters on a common support.

Although the LIDAR system is disclosed as outputting system output signals that carry different channels, all or a portion of the system output signals can carry the same channel. FIG. 11 is a topview of a LIDAR system that is suitable for use with system output signals can carry the same channel. The LIDAR system includes multiple LIDAR chips on a common support 122. The LIDAR chips output LIDAR output signals from components that are spaced apart from one another in the LIDAR system. The LIDAR chips are constructed according to FIG. 1 but are adapted so the different system output signals carry the same channel ($\lambda_1$). For instance, the reference waveguides 37 on different LIDAR chips each carries the reference signal directly to a processing component 34. Additionally, the input waveguides 16 on different LIDAR chips each carries a LIDAR input signal directly to a processing component 34 where it can act as a comparative signal.

A processing component 34 on one of the LIDAR chips can serve as a first processing component 34A and a processing component 34 on another one of the LIDAR chips can serve as a second processing component 34B in the disclosed electronics. For instance, a processing component 34 on one of the LIDAR chips can serve as a first processing component 34A and a processing component 34 on another one of the LIDAR chips can serve as a second processing component 34B in the electronics disclosed in the context of FIG. 7A through FIG. 10B. As a result, the LIDAR data can be generated from each of the system output signals.

The different system output signals output from the LIDAR system each carries the same channel labeled $\lambda_1$. The system output signals can each be directed by different directional components 132. The different directional components 132 can direct the different system output signals in different directions. As a result, the LIDAR data can be generated for different sample regions that are each illuminated by a different one of the system output signals.

Transmission components of the LIDAR system can be configured to reduce cross talk of the light from system output signals carrying the same channel. Examples of transmission components are the components into which the system return signal must the coupled in order to enter LIDAR system. For instance, the input waveguides 16 can serve as a transmission component when the LIDAR systems does not include a LIDAR adapter and a directional components 132. When the LIDAR systems does not include a directional components 132, a second port 106 can serve as a transmission component. When the LIDAR systems includes a directional components 132, the directional components 132 can serve as the transmission component.

The acceptance angle of the transmission components can be reduced so as to reduce or eliminate cross talk. Reducing the acceptance angles reduces the amount that the path of the system return signal between the object and the LIDAR system can deviate from the path of the system output signal between the object and the transmission component while still allowing the system return signal to be coupled into the LIDAR system. For instance, an acceptance angle of 0° would mean the system output signal and the system return signal would need to travel along the same path between the transmission component and the object in order to be coupled into the LIDAR system. In contrast, an acceptance angle of 1° would mean system return signal could enter transmission component at an angle of up to +/1° from the direction that the system output signal traveled away from the transmission component. As a result, reducing the acceptance angle of the transmission components reduces or eliminates the opportunity for light that originates from a first one of the transmission components from entering other transmission component(s) that are spaced apart from the first transmission component. Suitable acceptance angles include, but are not limited to, acceptance angles greater than 0°, 0.001°, or 0.01° and/or less than 0.05°, 0.1°, or 0.2°.

Figure 1A:
Figure 1B:
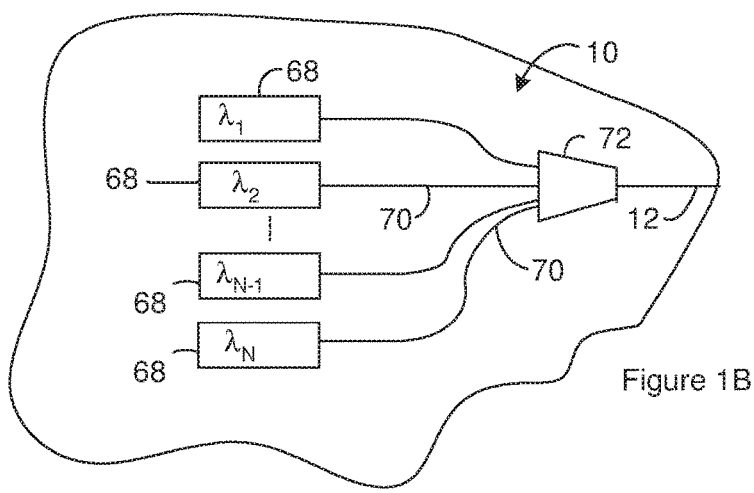
FIG. 1B illustrates a light source that includes multiple laser sources.

The LIDAR chips in the LIDAR system of FIG. 11 are configured to output a single system output signal for the purposes of simplifying the illustration; however, the LIDAR chips can be constructed as disclosed in the context of FIG. 1. As a result, the LIDAR system can output different system output signals that carry different channels but a portion of the system output signals carry the same channel. The system output signals that carry the same channel can be spaced apart from one another in that the exit from the LIDAR system at different locations and/or from different components. System output signals that carry different channels can exit from the LIDAR system at the same locations and/or from the same component.

Although FIG. 11, illustrates different LIDAR chip on the same common support 122, the optical and/or electrical circuitry shown on different LIDAR chips can be incorporated on the same LIDAR chip. For instance, the optical and/or electrical components on the different LIDAR chips illustrated in FIG. 11 can be on the same silicon-on-insulator platform. As a result, the optical and/or electrical components on the different LIDAR chips illustrated in FIG. 11 can be on the same substrate 92.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
one or more optical components that concurrently output multiple system output signals from the LIDAR system, each of the system output signals carrying a different wavelength channel;
electronics that use light from the system output signals to generate LIDAR data, the LIDAR data indicating a distance and/or radial velocity between the LIDAR system and one or more objects located outside of the LIDAR system;
the electronics including a series processing component that processes electrical signals that are each generated from one of the system output signals, the series processing component processes the electrical signals generated from different system output signals in series, and a delay mechanism that causes the electrical signals generated from different system output signals to be received in series by the series processing component.

2. The system of claim 1, wherein the electrical signals are beating signals.

3. The system of claim 2, wherein the series processing component outputs a beat frequency for the electrical signals.

4. The system of claim 1, wherein the series processing component performs a mathematical transform on the electrical signals.

5. The system of claim 4, wherein the mathematical transform is a Fourier transform.

6. The system of claim 5, wherein the Fourier transform is a complex Fourier transform.

7. The system of claim 1, wherein the delay mechanism is an optical delay mechanism.

8. The system of claim 1, wherein the delay mechanism is an electrical delay mechanism.

9. The system of claim 1, wherein each of the system output signals a frequency versus time pattern that includes multiple repeated cycles,
the cycles each including multiple different data periods where a rate of frequency change of the system output signals is constant in the data period, and
the system outputs signals each having a different rate and/or direction of frequency change in different data periods.

10. The system of claim 9, wherein each of the system outputs signal has a non-zero rate of frequency change in at least a portion of the data periods in the cycles of the system output signal.

11. The system of claim 9, wherein the frequency versus time pattern for different system output signals is delayed relative to one another such that the data periods for different system output signals only partially overlap in time.

12. The system of claim 11, wherein the rate of frequency change as a function of the data periods is the same for system output signals having frequency versus time patterns that are delayed relative to one another.

13. The system of claim 1, wherein a common line carries at least a portion of the electrical signals to one of the series processing components, the electrical signals carried on the common line being generated from different system output signals.

14. The system of claim 1, wherein the electrical signals received by the series processing component are a complex signal that includes an in-phase component and a quadrature component.

15. The system of claim 1, further comprising:
a LIDAR chip that outputs LIDAR output signals, the system output signals each including light from one the LIDAR output signals.

16. The system of claim 15, wherein the LIDAR chip includes a silicon-on-insulator platform.

17. The system of claim 15, wherein the series processing component receives the electrical signals from the LIDAR chip, and
the electrical signals are generated from beating optical signals guided by waveguides on the LIDAR chip, the beating optical signals including light from the system output signals.

18. The system of claim 1, wherein the electrical signals each carries a different one of the channels,
the series processing component processes the electrical signals that carry different channels in series, and processing the electrical signals includes calculating the LIDAR data.

19. The system of claim 1, wherein the system output signals travel away from the LIDAR system in different directions.

20. A LIDAR system, comprising:
one or more optical components that concurrently output multiple system output signals from the LIDAR system, each of the system output signals carrying a different wavelength channel,
  each of the system output signals has a frequency versus time pattern that includes multiple repeated cycles, the cycles each including multiple different data periods where a rate of frequency change of the system output signals is constant in the data period, and the system outputs signals each having a different rate and/or direction of frequency change in different data periods;
electronics that use light from the system output signals to generate LIDAR data, the LIDAR data indicating a distance and/or radial velocity between the LIDAR system and one or more objects located outside of the LIDAR system;
  the electronics including a series processing component that processes electrical signals that are each generated from one of the system output signals, the series processing component processes the electrical signals generated from different system output signals in series.

21. The system of claim 20, wherein the electrical signals are beating signals.

22. The system of claim 20, wherein the series processing component outputs a beat frequency for the electrical signals.

23. The system of claim 20, wherein the series processing component performs a mathematical transform on the electrical signals.

24. The system of claim 20, wherein the mathematical transform is a Fourier transform.

25. The system of claim 24, wherein the Fourier transform is a complex Fourier transform.

26. The system of claim 24, further comprising: a delay mechanism that causes the electrical signals generated from different system output signal to be received in series by the series processing component, wherein the delay mechanism is an optical delay mechanism.

27. The system of claim 20, further comprising: a delay mechanism that causes the electrical signals generated from different system output signal to be received in series by the series processing component, wherein the delay mechanism is an electrical delay mechanism.

28. The system of claim 20, wherein each of the system outputs signal has a non-zero rate of frequency change in at least a portion of the data periods in the cycles of the system output signal.

29. The system of claim 20, wherein the frequency versus time pattern for different system output signals is delayed relative to one another such that the data periods for different system output signals only partially overlap in time.

30. The system of claim 20, wherein the rate of frequency change as a function of the data periods is the same for system output signals having frequency versus time patterns that are delayed relative to one another.

31. The system of claim 20, wherein a common line carries at least a portion of the electrical signals to one of the series processing components, the electrical signals carried on the common line being generated from different system output signals.

32. The system of claim 20, wherein the electrical signals received by the series processing component are a complex signal that includes an in-phase component and a quadrature component.

33. The system of claim 20, further comprising:
a LIDAR chip that outputs LIDAR output signals, the system output signals each including light from one the LIDAR output signals.

34. The system of claim 33, wherein the LIDAR chip includes a silicon-on-insulator platform.

35. The system of claim 33, wherein the series processing component receives the electrical signals from the LIDAR chip, and
  the electrical signals are generated from beating optical signals guided by waveguides on the LIDAR chip, the beating optical signals including light from the system output signals.

36. The system of claim 20, wherein the electrical signals each carries a different one of the channels,
  the series processing component processes the electrical signals that carry different channels in series, and
  processing the electrical signals includes calculating the LIDAR data.

37. The system of claim 20, wherein the system output signals travel away from the LIDAR system in different directions.

\* \* \* \* \*